US011551475B2

(12) United States Patent
Wang et al.

(10) Patent No.: US 11,551,475 B2
(45) Date of Patent: Jan. 10, 2023

(54) SYSTEM ARCHITECTURE AND METHOD OF AUTHENTICATING A 3-D OBJECT

(71) Applicant: Purdue Research Foundation, West Lafayette, IN (US)

(72) Inventors: He Wang, West Lafayette, IN (US); Siyuan Cao, West Lafayette, IN (US); Habiba Farrukh, West Lafayette, IN (US); Reham Mohamed Aburas, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 311 days.

(21) Appl. No.: 16/819,166

(22) Filed: Mar. 15, 2020

(65) Prior Publication Data

US 2020/0302156 A1    Sep. 24, 2020

Related U.S. Application Data

(60) Provisional application No. 62/821,699, filed on Mar. 21, 2019.

(51) Int. Cl.
| | | |
|---|---|---|
| *G06K 9/00* | (2022.01) | |
| *G06V 40/16* | (2022.01) | |
| *G06F 21/32* | (2013.01) | |
| *G06F 17/16* | (2006.01) | |
| *G06F 21/46* | (2013.01) | |

(Continued)

(52) U.S. Cl.
CPC ............ *G06V 40/168* (2022.01); *G06F 17/16* (2013.01); *G06F 21/32* (2013.01); *G06F 21/36* (2013.01); *G06F 21/46* (2013.01); *G06K 19/06103* (2013.01)

(58) Field of Classification Search
CPC ............. G06V 20/64; G06V 2201/121; G06V 40/168; G06F 21/32
See application file for complete search history.

(56) References Cited

U.S. PATENT DOCUMENTS

| | | | |
|---|---|---|---|
| 2006/0067573 A1* | 3/2006 | Parr .................... | G06V 40/169 382/154 |
| 2014/0184749 A1* | 7/2014 | Hilliges ................ | H04N 13/20 348/47 |

(Continued)

OTHER PUBLICATIONS

Chan, P. et al., Face Liveness Detection Using a Flash Against 2D Spoofing Attack, IEEE Transactions on Information Forensics and Security, vol. 13, No. 2, Feb. 2018, 521-534.

(Continued)

*Primary Examiner* — Avinash Yentrapati
(74) *Attorney, Agent, or Firm* — Purdue Research Foundation

(57) ABSTRACT

A non-transitory computer-readable medium encoded with a computer-readable program which, when executed by a processor, will cause a computer to execute a method of authenticating a 3-D object with a 2-D camera, the method including building a pre-determined database. The method additionally includes registering the 3-D object to a storage unit of a device comprising the 2-D camera, thereby creating a registered 3-D model of the 3-D object. Additionally, the method includes authenticating a test 3-D object by comparing the test 3-D object to the registered 3-D model.

25 Claims, 14 Drawing Sheets

(51) Int. Cl.
*G06K 19/06* (2006.01)
*G06F 21/36* (2013.01)

(56) References Cited

U.S. PATENT DOCUMENTS

| | | | | |
|---|---|---|---|---|
| 2016/0070952 A1* | 3/2016 | Kim | ................ | G06T 17/00 382/118 |
| 2016/0093099 A1* | 3/2016 | Bridges | ................ | G01S 17/48 348/50 |
| 2016/0371555 A1* | 12/2016 | Derakhshani | ........... | G01S 15/10 |
| 2017/0257770 A1* | 9/2017 | Derakhshani | ........ | G06V 40/168 |
| 2019/0042831 A1* | 2/2019 | Ahn | ............... | G06V 20/64 |
| 2020/0250403 A1* | 8/2020 | Xiao | ................ | G06V 10/761 |

OTHER PUBLICATIONS

Dhamecha, T. J. et al., Disguise Detection and Face Recognition in Visible and Thermal Spectrums, Biometrics (ICB), 2013 International Conference on IEEE, 1-8 (2013).

Jee, H-K. et al., Liveness Detection for Embedded Face Recognition System. International Journal of Biological and Medical Sciences, vol. 1, No. 4, 235-238, (2006).

Kim, W. et al., Face Liveness Detection From a Single Image via Diffusion Speed Model, IEEE transactions on Image Processing, vol. 24, No. 8, Aug. 2015, 2456-2465.

Kollreider, K. et al., Real-Time Face Detection and Motion Analysis with Application in "Liveness" Assessment, IEEE Transactions on Information Forensics and Security, vol. 2, No. 3, Sep. 2007, 548-558.

Lagorio, A. et al., Liveness Detection Based on 3D Face Shape Analysis, 2013 International Workshop on Biometrics and Forensics (IWBF), IEEE 2013, 1-4.

Li, J. et al., Live Face Detection Based on the Analysis of Fourier Spectra, Proc. SPIE 5404, Biometric Technology for Human Identification, Aug. 25, 2004, 296-304.

Pan, G. et al., Monocular Camera-Based Face Liveness Detection by Combining Eyeblink and Scene Content, Telecommunication Systems, vol. 47, 215-225, Springer Aug. 4, 2010.

Tan, X. et al., iu, and Lin Jiang, Face Liveness Detection from a Single Image with Sparse Low Rank Bilinear Discriminative Model, European Conference on Computer Vision (ECCV), 2010, 504-517.

Tang, D. et al., Face Flashing: a Secure Liveness Detection Protocol based on Light Reflections, Network and Distributed Systems Security (NDSS) Symposium, Feb. 18-21, 2018, arXiv preprint:1801. 01949v2.

Woodham, R. J., Photometric Method for Determining Surface Orientation From Multiple Images. vol. 19, No. 1, 139-144 (1980).

Zhou, B. et al., EchoPrint: Two-factor Authentication using Acoustics and Vision on Smartphones, In Proceedings of the 24th Annual International Conference on Mobile Computing and Networking (MobiCom '18), Oct. 29-Nov. 2, 2018, ACM, 321-336.

\* cited by examiner

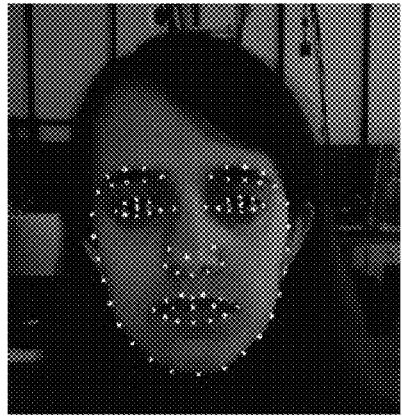 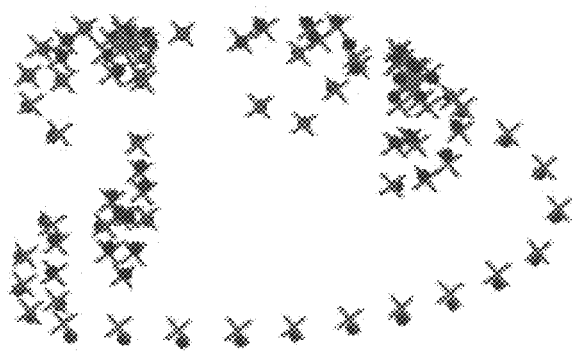
FIGURE 6(a)        FIGURE 6(b)
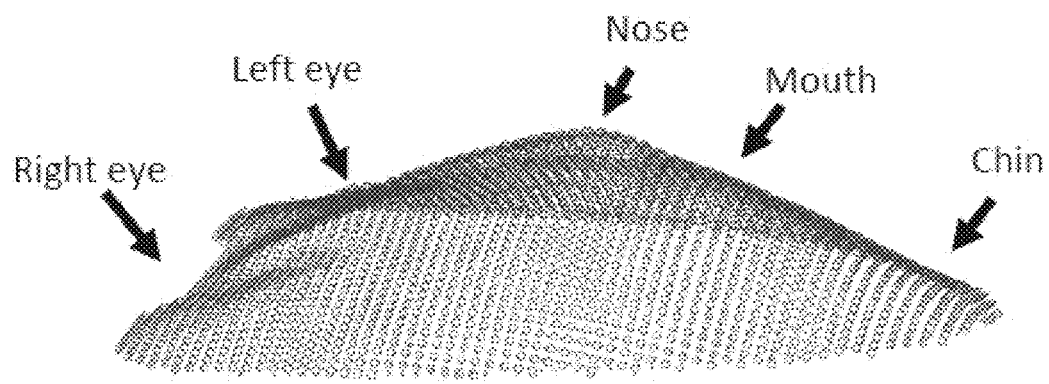
FIGURE 6(c)

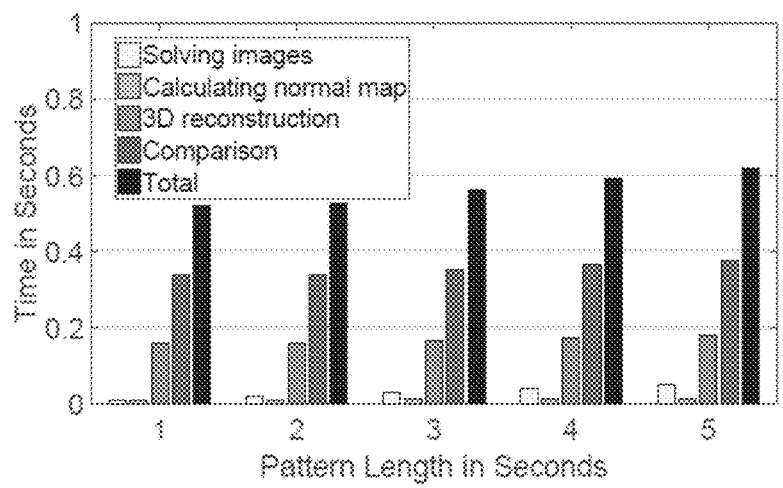
FIGURE 16
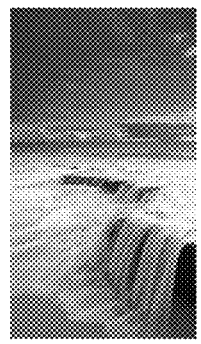 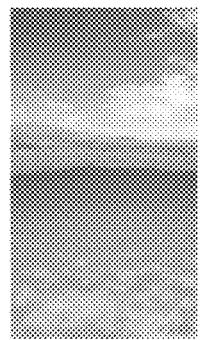 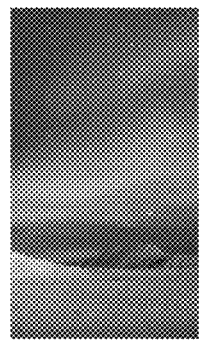 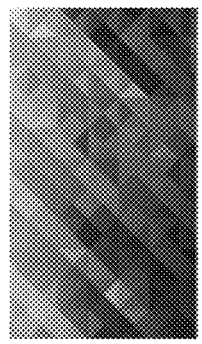 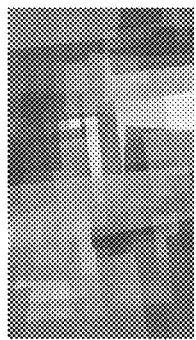
FIGURE 17(a)   FIGURE 17(b)   FIGURE 17(c)   FIGURE 17(d)   FIGURE 17(e)
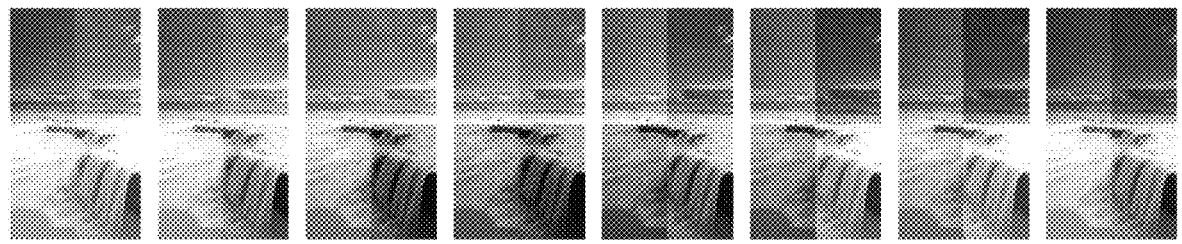
FIGURE 17(f)

ALGORITHM 1: Passcode Space Generation

Data: a set of passcodes $P$ and correlation threshold $Tr$
Result: passcode space $P_s$ /* build a graph $G_s = \langle V, E \rangle$ using $P$  */
$V \leftarrow P$
$E \leftarrow \phi$
for $v_s \in V$ do
    for $v_e \in V$ do
        if $v_s \neq v_e$ and $Correlation(v_s, v_e) > Tr$ then
            $E \leftarrow E \cup \overline{v_s v_e}$ $P_s \leftarrow \phi$
while $G_s$ *is empty* do
    Select node $v$ with minimum degree
    $P_s \leftarrow P_s \cup v$
    Remove $v$ and its neighbors from $G_s$

FIGURE 19

SYSTEM ARCHITECTURE AND METHOD OF AUTHENTICATING A 3-D OBJECT

CROSS-REFERENCE TO RELATED APPLICATIONS

The present U.S. Patent Applications is related to and claims the priority benefit of U.S. Provisional Patent Application Ser. No. 62/821,699, filed Mar. 21, 2019, the contents of which is hereby incorporated by reference in its entirety into this disclosure.

BACKGROUND

This section introduces aspects that may help facilitate a better understanding of the disclosure. Accordingly, these statements are to be read in this light and are not to be understood as admissions about what is or is not prior art.

Facial authentication mechanisms are gaining traction on smartphones because of the convenience with which human faces can be captured via smartphone cameras. However, the mainstream facial authentication systems use traditional 2D face recognition technologies, which are vulnerable to various spoofing attacks. Existing systems perform 3D face authentication via specialized hardware, such as infrared dot projectors and dedicated cameras. Although effective, such methods do not align well with the smartphone industry's desire to maximize screen space and minimize resource-consumption.

SUMMARY

One aspect of the present application relates to a non-transitory computer-readable medium encoded with a computer-readable program which, when executed by a processor, will cause a computer to execute a method of authenticating a 3-D object with a 2-D camera, the method including building a pre-determined database. The method additionally includes registering the 3-D object to a storage unit of a device comprising the 2-D camera, thereby creating a registered 3-D model of the 3-D object. Additionally, the method includes authenticating a test 3-D object by comparing the test 3-D object to the registered 3-D model.

Another aspect of the present application relates to a non-transitory computer-readable medium encoded with a computer-readable program which, when executed by a processor, will cause a computer to execute a method of authenticating a 3-D object with a 2-D camera, the method including building a pre-determined database. The building the pre-determined database includes using at least one of a set of frequencies or a set of phase offsets to create a plurality of selected patterns. The building the pre-determined database additionally includes creating a plurality of passcodes, wherein each passcode of the plurality of passcodes comprises at least three selected patterns. Further, the building the pre-determined database includes calculating an average of the at least three selected patterns, thereby generating a numerical value associated with the each passcode. Moreover, the building the pre-determined database includes selecting a subset of passcodes of the plurality of passcodes. Further, the method includes registering the 3-D object to a storage unit of a device comprising the 2-D camera, thereby creating a registered 3-D model of the 3-D object. Additionally, the method includes authenticating a test 3-D object by comparing the test 3-D object to the registered 3-D model.

Still another aspect of the present application relates to a non-transitory computer-readable medium encoded with a computer-readable program which, when executed by a processor, will cause a computer to execute a method of authenticating a 3-D object with a 2-D camera, the method including building a pre-determined database. The method additionally including registering the 3-D object to a storage unit of a device comprising the 2-D camera, thereby creating a registered 3-D model of the 3-D object. The registering the 3-D object to the storage unit of the device including the 2-D camera, thereby creating the registered 3-D model of the 3-D object includes reconstructing a computer generated 3-D model of the 3-D object, wherein the reconstructing includes choosing, randomly, a passcode from the pre-determined database, wherein the passcode comprises a plurality of selected patterns. The reconstructing additionally includes encoding the passcode to a random image, thereby generating an encoded sequence of images, wherein the encoded sequence of images comprises k images. Further, the reconstructing includes combining a sequence of the random image with the encoded sequence of images, thereby creating a second sequence of images, wherein the sequence of the random image comprises m number of random images. Moreover, the reconstructing includes displaying the second sequence of images on a screen of the device at a frame rate u, wherein u ranges from 0.01 Hz to 200 Hz. Next, the reconstructing includes recording a reflection of the second sequence of images from the 3-D object through the 2-D camera at a frame rate v, thereby creating a first recording, wherein v ranges from 0.01 Hz to 60000 Hz. The reconstructing moreover includes reconstructing from the first recording the computer generated 3-D model of the 3-D object. Further the reconstructing includes saving the computer generated 3-D model to the device. The method further includes authenticating a test 3-D object by comparing the test 3-D object to the registered 3-D model.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

FIG. 6(a) illustrates an example of the detected landmarks on a user's face image. FIG. 6(b) illustrates a coarse alignment obtained by using only landmarks. FIG. 6(c) illustrates a refined alignment by using all points in two 3D faces.

FIG. 16 illustrates the processing time for the various components of our system with changing passcode duration.

FIG. 17(a) illustrates a first image chosen as background for the light passcode. FIG. 17(b) illustrates a second image chosen as background for the light passcode. FIG. 17(c) illustrates a third image chosen as background for the light passcode. FIG. 17(d) illustrates a fourth image chosen as background for the light passcode. FIG. 17(e) illustrates a fifth image chosen as background for the light passcode. FIG. 17(f) illustrates what the passcode looks like with an image as background.

FIG. 19 illustrates one example algorithm for passcode space generation.

DETAILED DESCRIPTION

Figure 1:
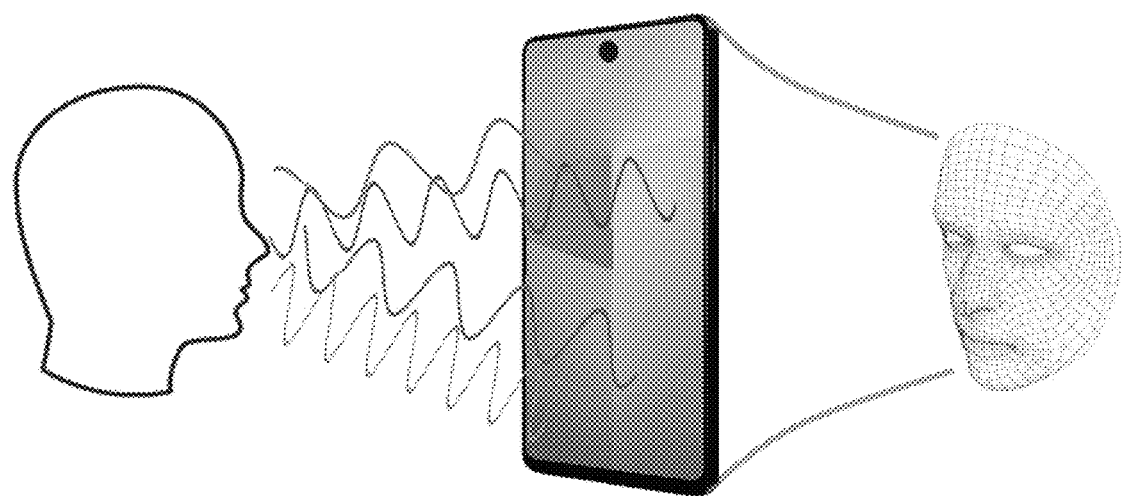
FIG. 1 illustrates an understanding of a use of the software architecture, whereby a phone sends different light signals which are reflected on the face.

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Various embodiments of the present application relate to a novel 3D face authentication system for smartphones with a single front camera. Such embodiments utilize the smartphone screen to illuminate a user's face from multiple directions. The facial images captured under varying illumination enable the recovery of the face surface normals via photometric stereo, which can then be integrated into a 3D shape. By comparing with preregistered 3D face models and verifying the generated light signals, such embodiments can authenticate the genuine user and meanwhile defend spoofing attacks conducted by printed photographs and replayed videos. We evaluate a software architecture of one or more of the embodiments with ten users trying to unlock the smartphone under various lighting conditions and with a series of 2D spoofing attacks. The results show that the software architecture achieves a mean EER of 9.9%, 4.5% and 0.66% against human, photo and video attacks, respectively.

One or more embodiments of the present application relate to a 3D face authentication system that only uses a front camera on a commercial smartphone. It can reconstruct and recognize users' 3D faces, and meanwhile enables liveness detection. Multiple embodiments use the smartphone screen as light sources to illuminate the human face from different directions. Then it displays a combination of light signals on the phone screen and records the reflection of these signals from the users' face via the front camera. We then employ a technique called photometric stereo to reconstruct the 3D facial structure from these recorded videos. For this purpose, we recover four stereo images of the face from the recorded video via a least squared solution for an over-constrained linear system of equations. We then build a normal map for the face from these recovered stereo images. Furthermore, a 3D face can be reconstructed from the normal map by using the Gauss-Seidel relaxation approach.

In addition, to secure the authentication process from replay attacks, we consider a light passcode. We define the light passcode to be a specific combination of light signals pattern in which the screen lighting changes. The light passcode changes with each use of the system which results in a different responses. This protects the system from replay video attacks since the passcode at a given time is unknown to the attacker. The probability of the attacker being able to guess the passcode correctly is very low, given the large sample space for possible light passcodes. We show that we can select the maximum number of uncorrelated passcodes approximately by formulating the problem as a maximum independent set problem.

Apart from providing the required security, for an authentication system to be practical, it should work in various ambient lighting conditions. In case of our system, the light signal reflected from the face is much weaker if the ambient light is strong, hence making the image recovery process hard. To be able to capture the small reflection changes despite of the ambient light, we study the parameters of the camera and observe that by adjusting the exposure parameters in manual mode, we can achieve a linear camera response. This enables 3D face structure analysis under different lighting conditions.

Example 1

A software architecture is implemented as a prototype system on Huawei Honor P10 smartphone. By collecting videos with a resolution of 1280×720 and a frame rate of 30 fps, we evaluated the software architecture with ten volunteers under three different lighting conditions, i.e. dark room, room with LEDs on and natural daylight. We collected a total of 1350 videos with these ten volunteers with a total recording time of 16200 seconds. The software architecture achieves an EER of 8.8%, 9.8% and 11.3% for the dark, LED lighting and day light setting, respectively. It detects the 2D photo attacks with an EER of 1.6%, 4.8% and 7.2% for each lighting, respectively. And it detects the replay video attacks with an EER of 0%, 0% and 2% for each lighting, respectively.

Figure 2:
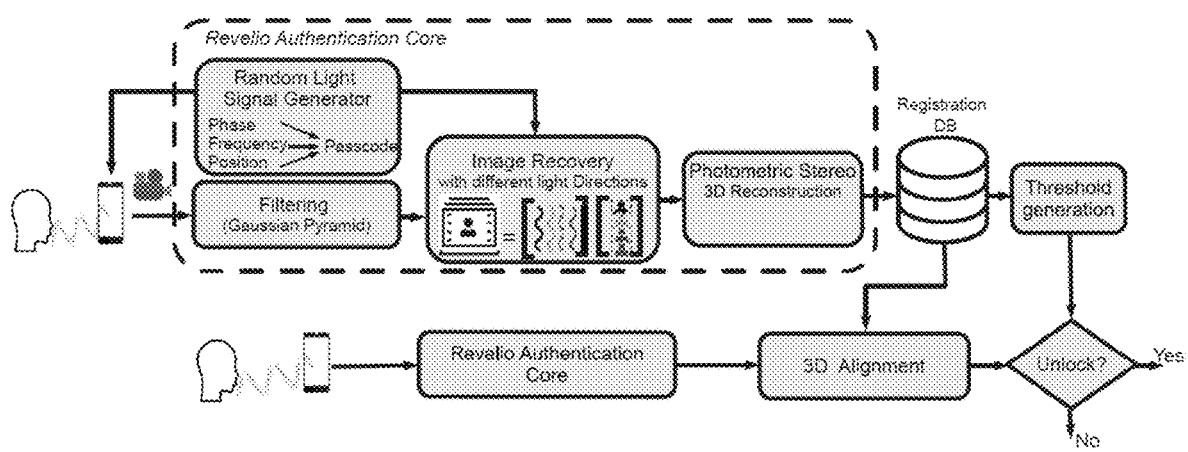
FIG. 2 illustrates a global overview of the system architecture, in accordance with one or more embodiments.

FIG. 1 illustrates an understanding of a use of the software architecture, whereby a phone sends different light signals which are reflected on the face. The reflections from these signals are used to reconstruct the 3D face structure. In order to do the above, we use photometric stereo for 3D reconstruction under known/unknown lighting conditions. FIG. 2 illustrates a global overview of the system architecture, in accordance with one or more embodiments. Photometric stereo is a technique for recovering the 3D surface of an object using multiple images in which the object is fixed and lighting conditions vary. It utilizes the fact that the amount of light that a surface reflects depends on the orientation of the surface with respect to the light source and the camera. By measuring these reflections under enough numbers of different light conditions, the surface normals can be constrained to a single orientation, and therefore the 3D model of the object can be reconstructed.

Besides the original assumptions under which photometric stereo is normally used (e.g. point light sources, uniform albedo, etc.), we now assume that the illumination is known. For one image with n pixels, we define $I_i$ as a vector of n observed intensities, $L_i$ as a 3×1 vector of the normalized light direction, and S as a 3×n matrix of the surface normals. The relationship among these three matrices is shown as the following:

$$I_i^T = L_i^T S, i=1,2,3. \tag{1}$$

Once we are given three point light sources, the surface normal vectors S can be computed by solving the following linear equation based on the two known variables:

$$I^T = L^T S, \tag{2}$$

where $I=[I_1, I_2, I_3]$ and I is the stacked three images exposed to different illumination, and $L=[L_1, L_2, L_3]$. Note that at least three images under variant lighting conditions are required to solve this equation and to make sure that the surface normal are constrained.

We now consider the case when the lighting conditions are unknown. The matrix of intensity measurements if further denoted as M, which is of size m×n where m is the number of images. Therefore $$M = L^T S, \tag{3}$$

For solving the above approximation, M is factorized using Singular Value Decomposition (SVD). Using SVD the following is obtained $$M = U\Sigma V^T \tag{4}$$

This decomposition can be used to recover L and S in the form of $L^T = U\sqrt{\Sigma}A$ and $S = A^{-1}\sqrt{\Sigma}V^T$, where A is a 3×3 linear ambiguity matrix.

The final step towards obtaining the 3D coordinates of the image points is to solve the 3D shape from the normals. This includes employing the Gauss-Seidel relaxation approach where the depth at each pixel is incrementally updated based on the estimated surface normals and previously computed depth values of the pixel's neighbors.

The software architecture is a 3D face authentication and liveness detection system. It composes two phases: registration and authentication. In the registration phase, the user registers its face by holding a phone in front of its face. The phone screen is divided into four quarters and each of them is used as a light source, which is illuminated by different patterns using a combination of four frequencies and phase offsets. The front camera records a video clip containing the reflection of these light signals from the user's face. A 3D face is then reconstructed from the recorded video using a variant of photometric stereo technique and stored in a database for future usage. When a person tries to unlock the phone on another occasion, the phone will repeat the process of recording video clips and reconstructing the person's 3D face. The newly-generated 3D face is aligned to the registered face using the perspective transformation based on facial landmarks and Iterative Closest Point algorithm (ICP) on all 3D points. Then the similarity between the two 3D surfaces is compared by pairing nearest points in the two surfaces and computing the Root Mean Square (RMS) among all the point pairs. The testee is authorized as the genuine user if the comparison result is within a preset threshold. Also, it can also be detected if the "testee" is a printed photograph or a replayed video since software architecture is capable of defending spoofing attacks.

A central technical function module in the software architecture is illustrated as Revelio Authentication Core in FIG. 2. Random Light Signal Generator module is used to randomly select a passcode signal from a large space, which is a collection of four patterns displayed in the four quarters of the phone screen. These light signals are not only used during video recording, but also help reconstruct 3D structures and defend replay video attacks. The recorded video is first preprocessed by constructing its Gaussian Pyramid, where each frame is smoothed and subsampled to remove noise. The filtered video frames along with the randomly-generated light signals are fed into an Image Recovery module. One goal of this module is to recover the four stereo images corresponding to the four light sources, by utilizing the linearity of the camera response. The four recovered stereo images are used to compute surface normal under unknown lighting conditions and the 3D face is reconstructed from the normals by using the Gauss-Seidel relaxation approach.

Figure 3A:
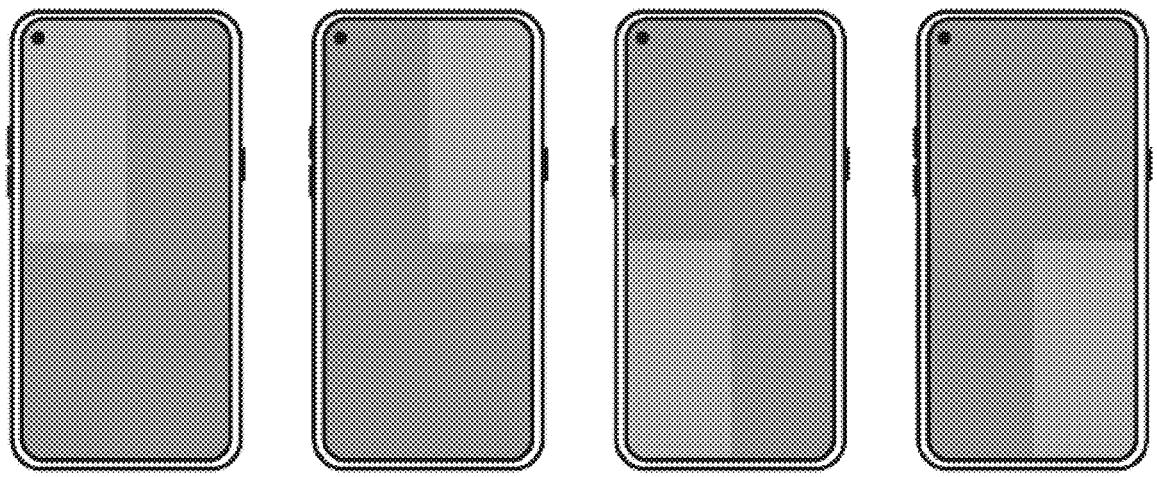
FIG. 3(a) illustrates the different changes in screen patterns during the four intervals.

To apply photometric stereo, we need to generate four images with various light sources, from different directions. In order to simulate these light sources using the phone screen, we divide the screen into four quarters where each quarter is assumed a light source. During the video recording, each of these quarters is illuminated alternately in four equal intervals, while the other three quarters are dark. FIG. 3(a) illustrates the different changes in screen patterns during the four intervals. In this basic pattern setting, we set each pixel of the screen in the illuminated quarter to 1 and all the other pixels are set to 0.

Figure 3B:
FIG. 3(b) illustrates the x, y, and z components of the constructed normal map.
Figure 3C:
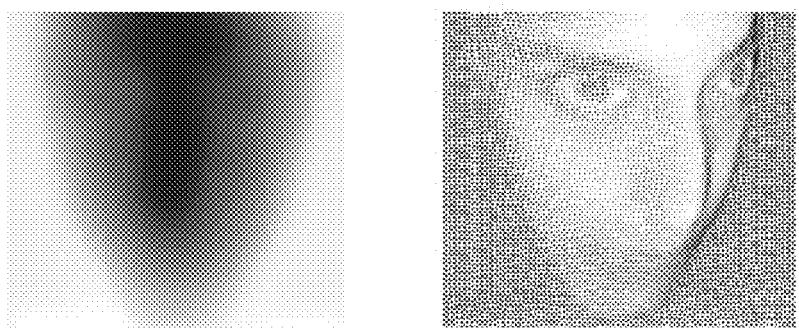
FIG. 3(c) illustrates the 3D reconstruction of the face.

FIG. 3(b) illustrates the x, y, and z components of the constructed normal map. FIG. 3(c) illustrates the 3D reconstruction of the face. The left figure shows the depth map. It is clear that the closer points to the light source (phone screen), e.g. the nose and forehead, are darker since they have smaller depth. While the farther points, e.g. the eyes and cheek sides, are brighter. The 3D reconstructed face, in the right figure, illustrates the capability of using the proposed phone screen lighting for 3D reconstruction.

It could be argued that using this basic lighting patterns, the system would be prone to replay attacks, where an adversary can record a video of the real user with the same lighting patterns or simulate these patterns, then replay the video for authentication. For this purpose, we propose a Random Passcode Generator that randomly selects a passcode signal from a large space, which variates at each authentication attempt. We define a passcode as a collection of four patterns displayed in the four quarters. Each pattern contains a light signal with a certain frequency and phase offset.

We generate a specific light pattern $P_j$ for quarter j. During a time interval $t_s$, $P_j$ is the light signal represented as $$P_j=0.5\cos(2\pi f_j t_s)+\phi_j, j=1,2,3,4 \qquad (5)$$

where $f_j$ and $\phi_j$ are the frequency and phase offset of the generated signal, respectively. For each authentication attempt, we randomly choose a frequency and offset value for each quarter. The selecting space consists of five frequencies $f_j=\{1, 2, \ldots, 5\}$ and four phase offsets $\phi_j=\{45°, 135°, 225°, 315°\}$. The maximum frequency is set to 5 Hz since it is limited by the refreshing rate of smartphone screens. Although current smartphone screens support a refreshing rate of 30 Hz, it takes a certain time for the screen to be gradually updated from top to bottom. And when the frequency is set to higher than 5 Hz, the intensity within each quarter may not be consistent. Also, since we use a small recording period (3 seconds), there will not be sufficient changes in the pattern signal if its frequency is set to less than 1 Hz. Thus for the four quarters, we can generate 204 different passcodes using full combinations of the frequency and offset values. However, these passcodes are subject to some constraints, which makes some of them invalid.

After generating a random passcode, the corresponding light signals on the smartphone screen and record a video of the reflections from a user's face using the front camera on the screen. Since our following algorithms focus on how the changes in lighting conditions affect the captured face images, we preprocess the recorded video by converting each frame from the color space to the HSV space. Only the V component will be kept and the other two components are discarded since the V component reflects the brightness of an image. Then, each video frame represented by the V component are further processed using Gaussian pyramid for removing noises and optimizing the video size. Gaussian pyramid filtering operates by iteratively smoothing and subsampling a video frame. In each iteration, the size of the video frame decreases by a factor of 2. So it decreases the spatial sampling density while retaining the important features within the frame. We use three levels of pyramid and select the peak of the pyramid in the subsequent steps for video analysis, which reduces the system's processing time.

In photometric stereo, at least three stereo images with different single light source are needed for computing the surface normals. However, what we obtained so far is a series of frames, in which the lighting on the face at any given time is a combined effect of all four lighting patterns on the screen. Therefore, we need to recover these stereo images for each quarter from the filtered video frames, which is different from the traditional way of directly collecting stereo images used for photometric stereo.

Based on the theory that the intensities of incoherent lights add linearly, an intuitive way to recover the stereo images is to directly solve the following equation:

$$G=WX \qquad (6)$$

G is a f×n matrix representing the light intensity values received on each pixel in the recorded video frames, where f is the number of frames and n is the number of pixels in one frame. W represents the f×4 light signals $[P_1;P_2;P_3;P_4]$ used while recording the video. $X(=[I_1;I_2;I_3;I_4])$ is a 4×n matrix representing the four stereo images that we aim to recover. Equation 6 utilizes the fact that under a combined lighting condition, the light intensity received on a certain pixel is a weighted sum of four light intensities with a single light from each quarter.

However, we cannot directly use Equation 6 unless under the assumption that camera sensors can accurately capture light intensities and reflect the actual values. Problems, e.g. inaccurate image recovery, will arise if we ignore the possible effects of camera parameters and sensitivity. To take these factors into consideration and better understand the relationship between the captured camera signals and the actual light intensities, we study the behavior of smartphone cameras at different settings.

Figure 4A:
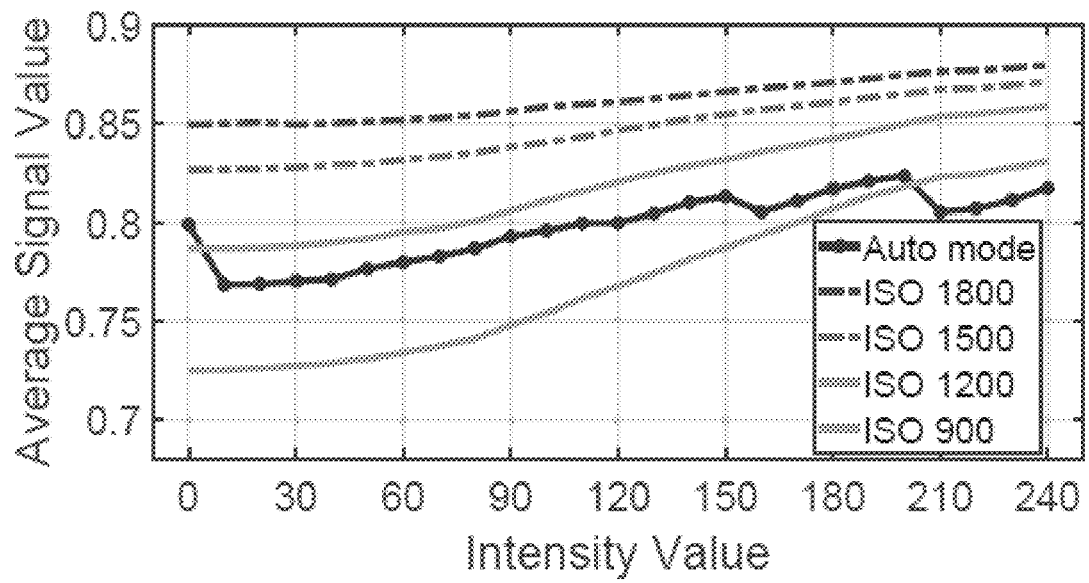
FIG. 4(a) illustrates camera response curves at different lighting intensities in auto or manual mode with different ISOs.
Figure 4B:
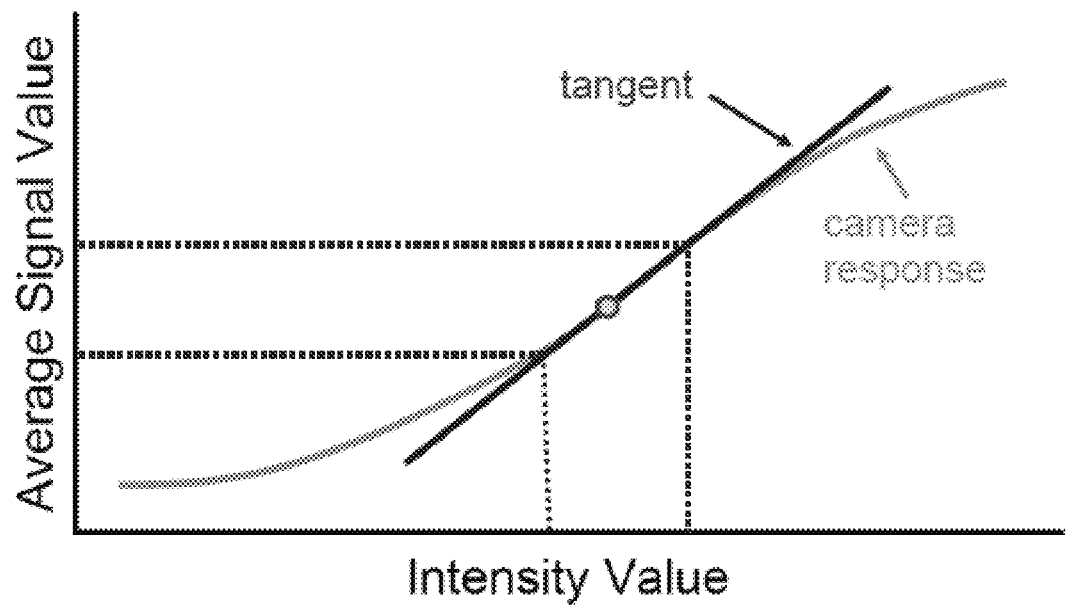
FIG. 4(b) illustrates a close-up of a camera response curve with the ISO set to a fixed value.

Recently, smartphone camera APIs started supporting manual camera mode which gives the user full control of the exposure parameters, i.e. aperture, shutter speed (exposure time) and sensitivity (ISO), which together decide the exposure and appearance of the captured images. In automatic mode, the camera senses ambient lights and automatically adjusts these parameters to provide better image brightness while maintaining minimum grain. To verify which camera mode and parameters that we should choose, we measure the camera response while gradually increasing the light intensity of the screen, with the front camera set to different settings. As shown by the red line in FIG. 4(a), when set to the auto mode, the camera continuously adjusts its ISO to compensate the lighting changes. In this case, the captured camera signals don't have a fixed relationship with the actual lighting intensities. In other words, we cannot easily obtain the real intensity values via a linear transformation. In contrast, we can observe an approximate linear relationship between the light intensity and the camera response when the camera is in the manual mode and its ISO is set to a certain fixed value. FIG. 4(b) gives a close-up of the camera response curve when the camera has a fixed ISO [4, 5]. The dark area and the saturation area show the camera response to very low/high light, which is noisy, unpredictable and nonlinear. Between these two nonlinear areas, the camera response curve falls into a linear area, where the screen light intensity is in the range of [110, 190]. It can be predicted and formulated as the following linear model:

$$y=kx+b, \qquad (7)$$

Based on these observations, we use the manual mode. Now to generalize Equation 7 to a frame containing multiple pixels, we get $$K=kG+b, \qquad (8)$$

Where K is the video frames that the camera actually captured. By substituting Equation 6 into Equation 8, we get $$K=kSX+b, \qquad (9)$$

Finally, we use the least square method to optimize $$(k^*, b^*, X^*) = \underset{(k,b,X)}{\operatorname{argmin}} \|K - kSX - b\|^2, \qquad (10)$$

Note that the optimized X* will have an uncertainty of a scale factor. For any $\alpha>0$, let $$X' = \alpha X^*, k' = \frac{1}{\alpha}k^*.$$

X', k', and b* will also minimize the above function. However, this will not have an impact on the reconstructed surface normal. When X* and X' are both factorized using SVD, the decompositions are $$X^* = U\Sigma V^T \quad (11)$$

and $$X' = U(\alpha\Sigma)V^T \quad (12)$$

Figure 5A:
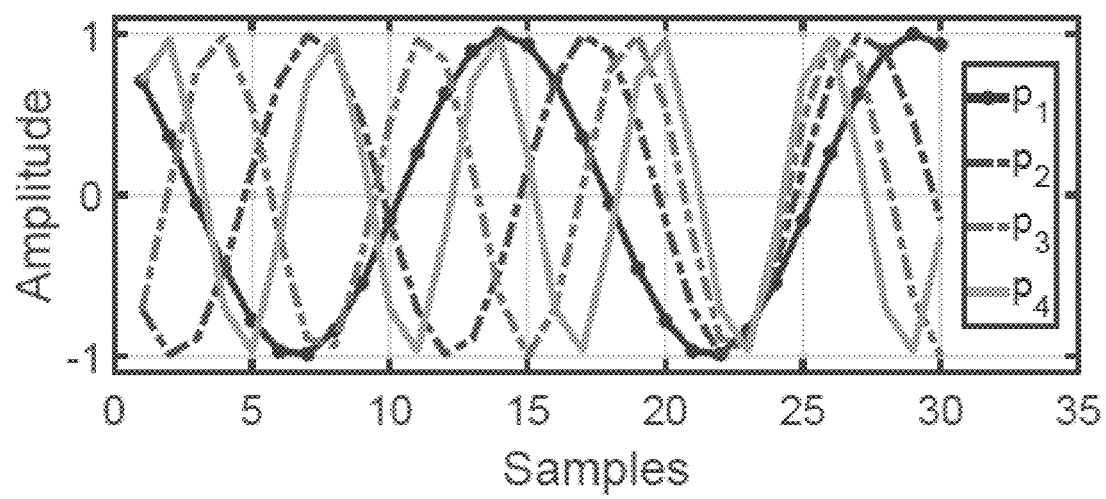
FIG. 5(a) illustrates the four light patterns displayed on the four quarters of the phone screen.
Figure 5B:
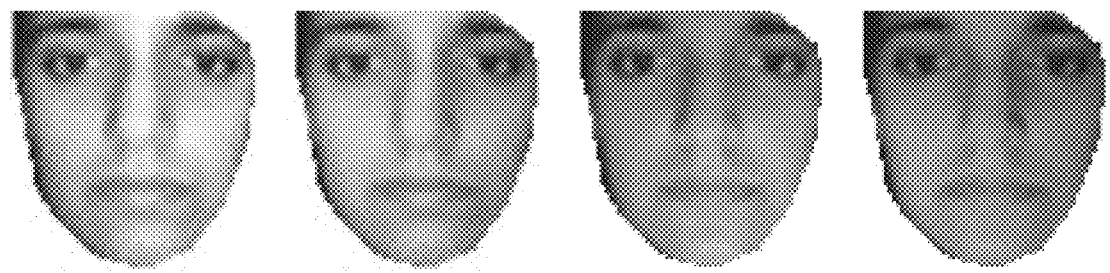
FIG. 5(b) illustrates the recovered four stereo images corresponding to each single light.
Figure 5C:
FIG. 5(c) illustrates the x, y, and z component of the reconstructed normal map.

The surface normal $V^T$ will stay the same in these two cases. From the above observation, we can set k=1 without any impact on the surface normals. FIG. 5 illustrates an example of a randomly generated passcode and the face reconstructed based on it. FIG. 5(*a*) illustrates the four light patterns displayed on the four quarters of the phone screen. The recovered four stereo images corresponding to each single light are shown in FIG. 5(*b*). The x, y, and z component of the reconstructed normal map are illustrated in FIG. 5(*c*).

The stereo images recovered from the least squared error solution approximate the facial images taken with four different point lights. Before conducting the normal steps described in earlier, we identify and extract the face region in each of the four stereo images. The extracted face region, instead of the entire image, will be used in further processing. To achieve this goal, we utilize a facial detection and recognition service named Face++, which detects 83 facial landmarks on a single 2D image. FIG. 6(*a*) illustrates an example of the detected landmarks on a user's face image. These landmarks are not only used to define the face region, but also help to align two faces during the comparison. So far we define the face region as the range circled by the outer landmarks and reconstruct 3D surface within this area.

Now before we go further towards 3D authentication, we need to first clarify how we measure the similarity between two 3D faces. The primary obstacle in this step is to correctly align the two 3D shapes. To overcome this, the 83 landmarks in both images are paired and utilized to find a coarse perspective transformation, i.e. rotation and translation, between them. To ensure that not only the landmarks but also all the points in these two 3D faces are well aligned, we employ Iterative Closest Point algorithm (ICP) to refine the transformation, which minimizes the average distance between the two point clouds. Here the coarse perspective transformation that we obtained from the previous step is fed to ICP as its initial estimation of the transformation. This initial estimation not only helps accelerate the convergence of ICP algorithm, but also prevents the alignment result from getting stuck into a local minimum. The transformation is then applied to the 3D structure so that the two 3D faces are aligned. Examples of the coarse and the refined alignments are illustrated in FIG. 6(*b*) and FIG. 6(*c*), respectively. Now we determine the similarity between the two 3D surfaces by pairing nearest points in the two surfaces and computing the Root Mean Square (RMS) among all the point pairs.

In the software architecture, each user preregisters its face by recording five video clips under the randomly generated light signals. Based on the pairwise RMS among these five videos, we fit these ten RMS values by a normal distribution with parameters $\mu$ and $\sigma$. A threshold is set to $\mu+\sigma$, so that when trying to authenticate a testee, the person is declared genuine if the RMS between its face and the registered face is below the preset adaptive threshold.

Figure 7:
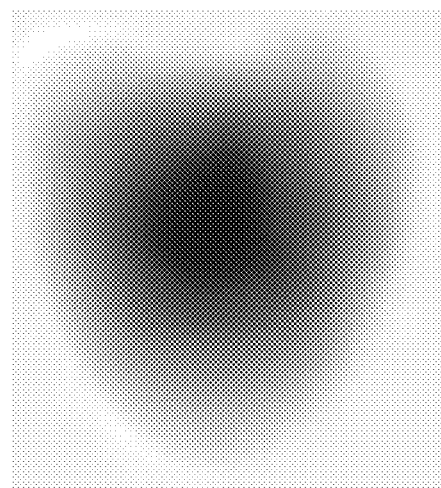
FIG. 7 illustrates the depth map for a printed photograph.

To protect the system from 2D printed photograph attacks, we need to determine whether the reconstructed 3D face belongs to a real/live person or a printed photograph. FIG. 7 illustrates the depth map for a printed photograph. It is clear that the depth map of a 2D photograph lacks facial features, e.g. nose, mouth and eyes, which makes it easy to be distinguished from real faces.

We notice that the color spatial distribution of the normal maps of a real face and a 2D photograph are quite different, so we use a spatiogram for detection. Spatiograms capture how colors are distributed in 2D space. We use a second order spatiogram with 8 bins, where each bin contains the number of pixels in this been, the mean vectors and covariance matrices of these pixels coordinates. We construct a spatiogram for the normal map of the user's face at the registration phase. Then, in the authentication phase, we construct the spatiogram from the video recording and compute the similarity with the registered spatiogram. We use the Bhattacharyya coefficient for spatiogram comparison. If the coefficient value is above a threshold $\tau_s$, the system detects a real face. Otherwise, the authentication is denied.

Figure 8:
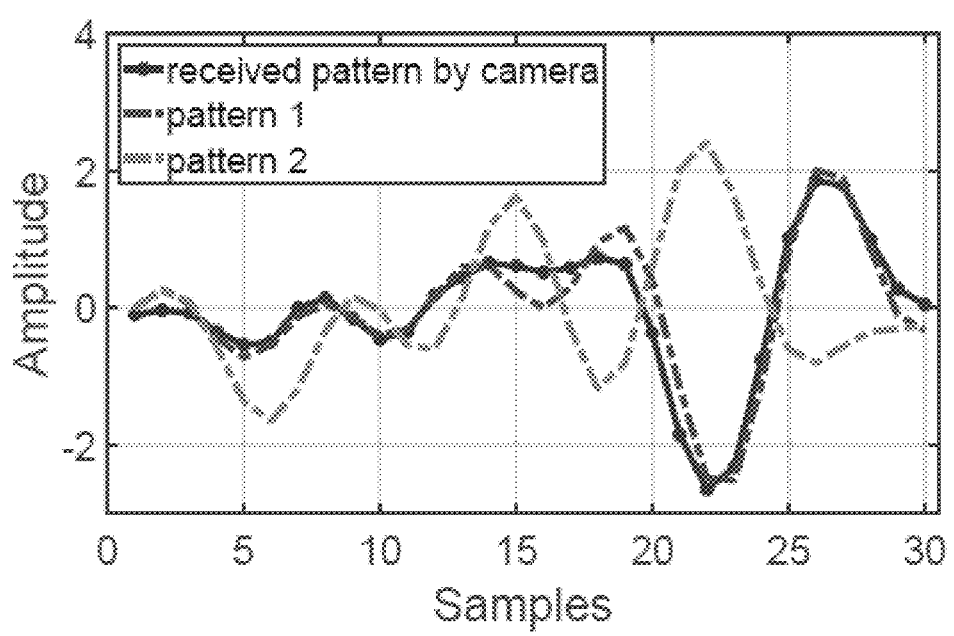
FIG. 8 illustrates the intensity from a passcode collected from a video and two generated passcodes.

We design different methods to detect replay video attacks. One method uses temporal correlation between the intensity of the generated passcode and the intensity of the passcode collected from the video recording. The intensity is defined as the sum of the four patterns of the passcode. To compute the intensity of the passcode from the recording, we use the signal at the forehead where all the light sources aggregate at this point. FIG. 8 illustrates the intensity from a passcode collected from a video and two generated passcodes: one of them is equivalent to the video and the other is not. It demonstrates that the intensity generated from the other pattern is quite different from that of the video (low correlation), while the intensity generated from the same passcode is very similar (high correlation). Therefore, by computing the correlation between the generated and the collected passcode intensities, a replay video attack can be detected and defended.

Figure 9:
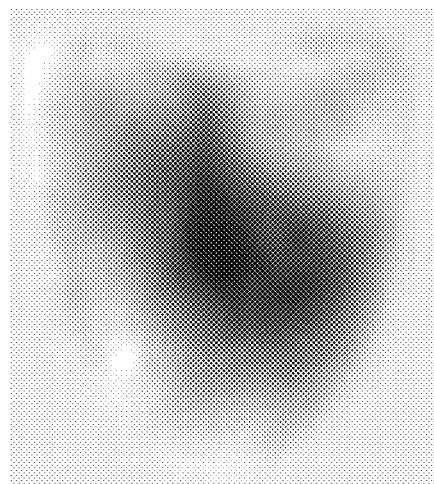
FIG. 9 illustrates the depth map constructed from a replayed video.

Replay attacks can also be detected from the depth map. FIG. 9 illustrates the depth map constructed from a replayed video. The depth map cannot be correctly reconstructed from the recorded video due to the mismatched passcode, the 2D planar structure of the replaying screen, and the imperfection of the replay timing.

We have shown that using our random passcode generator, we can generate up to 160,000 different patterns. However, we add some constraints on the generated passcodes based on our constructed model. First, as shown before, the software architecture is modeled as a linear system of equations (Equation 9). To solve this equation, the columns of S must be linearly independent. This adds a constraint on our generated passcodes, where the selected patterns of each passcode must have different frequencies or similar frequencies with independent phase offsets, i.e. the phase difference between any two patterns with similar frequencies cannot be 0° or 180°. This reduces our passcode space to 80640 different passcodes.

The second constraint is that passcodes with small difference result in signals that are quite similar, which makes it hard for the system to differentiate. Consequently, we must verify that any two passcodes in our passcode space are not correlated. Counting the number of decorrelated passcodes can be modeled as the well-known Maximum Independent Set problem. This is an NP-complete problem that can be solved using a greedy algorithm. We model our passcode space as a graph Gs that contains all passcodes, where each vertex represents a passcode. We compute the correlation between each pair of vertices. If the correlation value is greater than a threshold $\lambda$, we add an edge between the two vertices. Our goal is to select the maximum number of uncorrelated passcodes. The greedy algorithm iteratively selects a vertex with minimum degree, adds it to a set Ps, then removes this vertex and all its neighbors from Gs. The algorithm steps are illustrated in Algorithm 1 shown in FIG. 19.

We note that some passcodes have exactly the same patterns but are shuffled in order. The correlation of these passcodes is equal to one although they are spatially different. So by adding the permutations of each passcode, we can increase the passcode space by a factor of 24.

Figure 10:
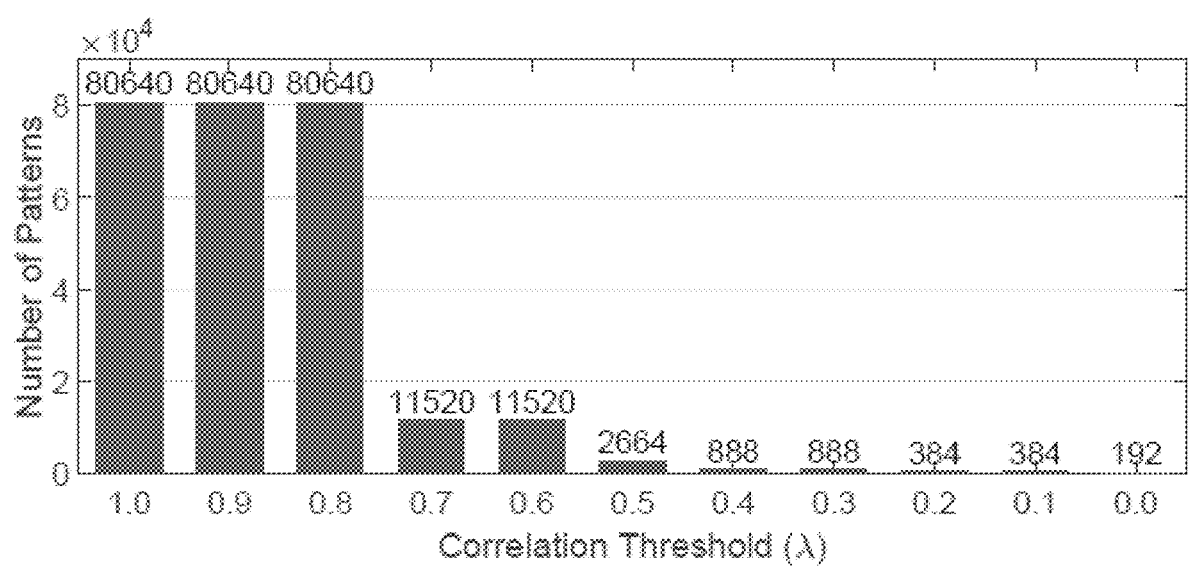
FIG. 10 illustrates the number of different passcodes in the passcode space with different values of λ.

FIG. 10 illustrates the number of different passcodes in the passcode space with different values of λ. If we select λ=0.6, we guarantee a low correlation between passcodes. This reduces our space to 11, 000 passcodes, which is still large enough to protect the system against replay video attacks.

We implemented a prototype for the software architecture on Huawei Honor P10 which runs Android 8.1, with 8 MP front camera that supports Camera2 API. The videos collected for our authentication system have a resolution of 1280×720 and a frame rate of 30 fps. For each experiment setting, we display the passcode patterns on the smartphone screen and record a video of the reflections from the user's face via the front camera. We use Face++ for landmark detection and OpenCV in the image recovery and reconstruction modules of our system.

We evaluated the surface architecture with 10 volunteers using our system for facial authentication. The volunteers included 5 males and 5 females. We evaluated the performance of our system in three lighting conditions: dark room, room with LED lights on and natural daylight. We collected a total of 1350 videos with these 10 volunteers with a total recording time of 16200 s. Each volunteer performed 15 trials of the registration phase for each lighting condition. A random passcode with an amplitude 50 was used with a grey background for each of these 15 trials. During the experiments, the volunteers were asked to locate their head within the camera view and limit the movement during the duration of the video. We tested the software architecture with various passcode amplitudes and durations in each of the lighting conditions. For each of these settings, each volunteer performed 25 trials of the authentication phase.

Figure 11A:
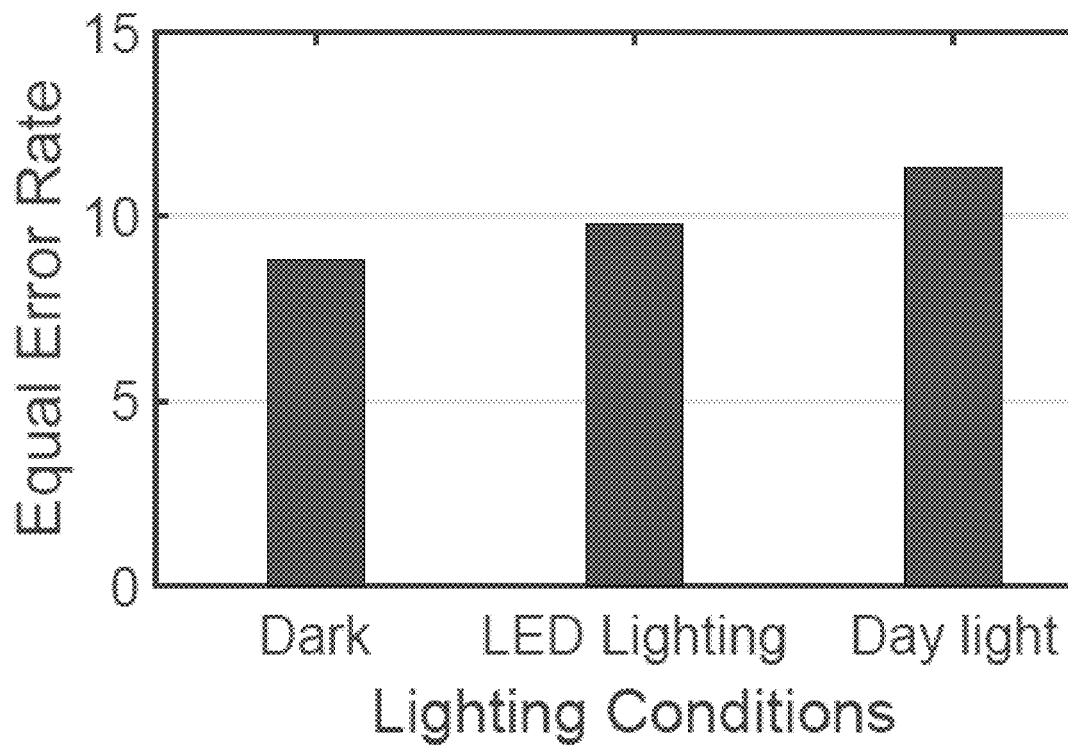
FIG. 11(a) illustrates the overall performance of the software architecture in detecting human attack.

To determine the overall performance of our system, we conducted experiments with a fixed amplitude of 50 for the passcode in all three lighting conditions. Each volunteer performed 25 trials of the authentication phase with a randomly selected passcode of duration 5 s in each trial. These 25 trials from each volunteer are then also used to get into the system with each of the other 9 users as the registered user. From the registration phase, we determine a model for the distances between depth maps of the same user. This model is then used to generate a threshold value to determine if the user is genuine in the authentication phase. FIG. 11(a) illustrates the overall performance of the software architecture in detecting human attack. We report the accuracy of our system as the equal error rate (EER) in the three lighting conditions. We achieve an EER of 8.8%, 9.8% and 11.3% for the dark, LED lighting and day light setting respectively. The system performs best in dark lighting conditions because the impact of our light passcode is stronger when the ambient lighting is weaker. Hence, the signal-to-noise ratio in the recorded reflections from the face is lower, resulting in a better 3D reconstruction. Here, also note that this accuracy is based only on the depth map comparison of the whole face, without any feature extraction. Existing face recognition techniques already achieve good performance in facial feature extraction and can benefit from our method.

Figure 11B:
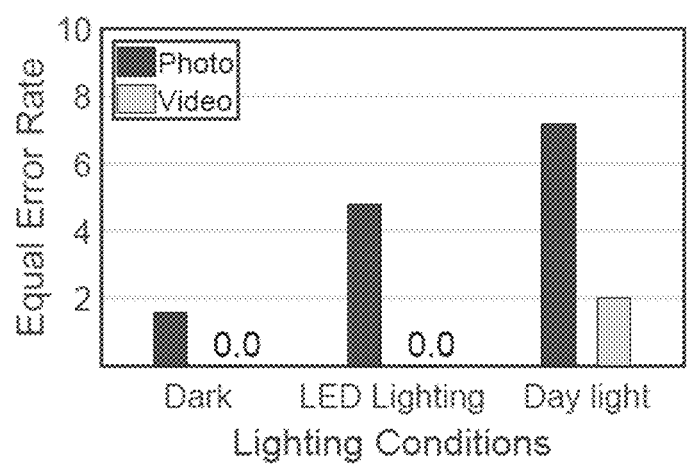
FIG. 11(b) illustrates the performance against defending the photo and video attacks in the three lighting conditions.

We also evaluated our system's ability to defend against 2D printed photograph and video replay attacks. During all the authentication trials, we collected a high-quality image of the user to test the performance of our system against photo attacks. For the video replay attack, we used the videos collected in the authentication trials from real users and replayed them to the system. Therefore, the total number of authentication trials using a photograph were the same as the trials with real human users. FIG. 11(b) illustrates the performance against defending the photo and video attacks in the three lighting conditions. The software architecture detected the 2D photo attacks with an EER of 1.6%, 4.8% and 7.2% for each lighting respectively. We evaluated our system against video replay attacks by using videos collected from the volunteers in the 25 authentication trials. To test the performance of using the random light passcode for authentication, we used each collected video to authenticate with 50 random passcodes for each user. In total, we selected 500 random passcodes and tried to spoof our system with videos from the authentication trial. Our system is able to detect the video replay attacks with an EER of 0% in dark and LED lighting and only 2% in daylight.

Figure 12:
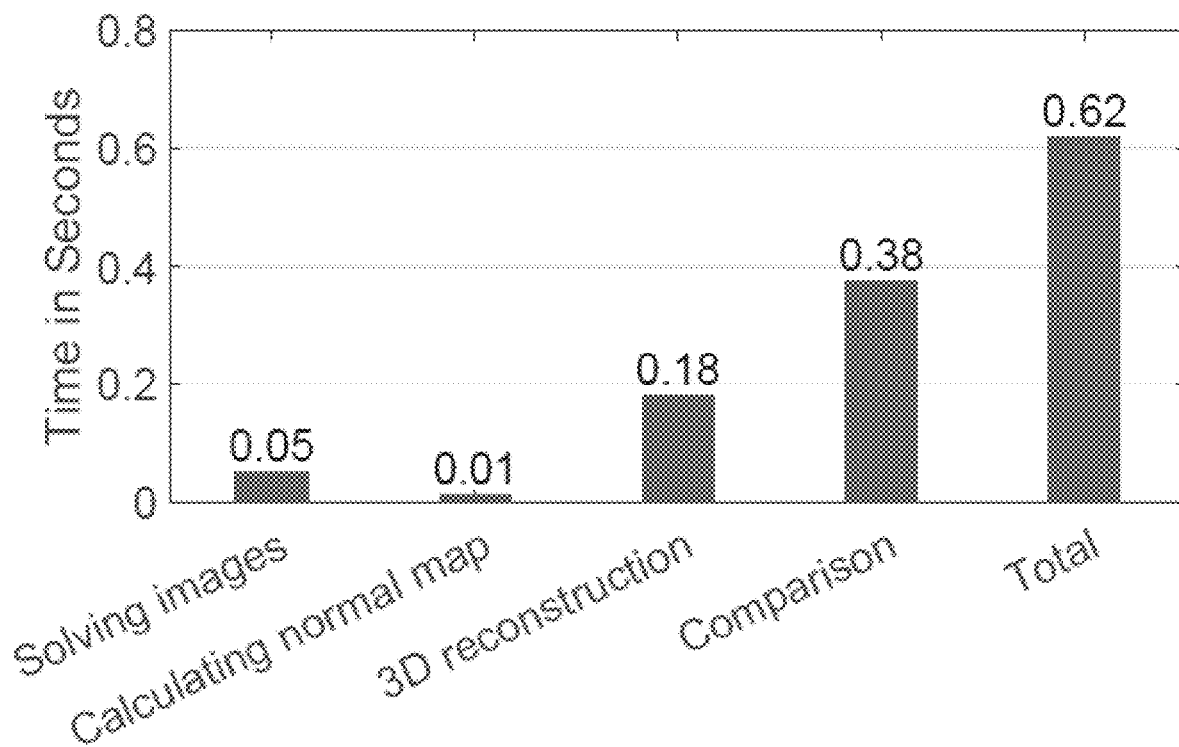
FIG. 12 illustrates the processing time of the different modules of our system.

Another performance metric is the total time it takes to authenticate a user with the software architecture. FIG. 12 illustrates the processing time of the different modules of our system. On top of the signal duration of the passcode, the authentication process only takes 0.62 s in total. The stereo images recovery and surface normal reconstruction only take 0.05 s. The most expensive computation step is the depth comparison when the depth map from authentication phase is compared with samples from the registration database.

Figure 13:
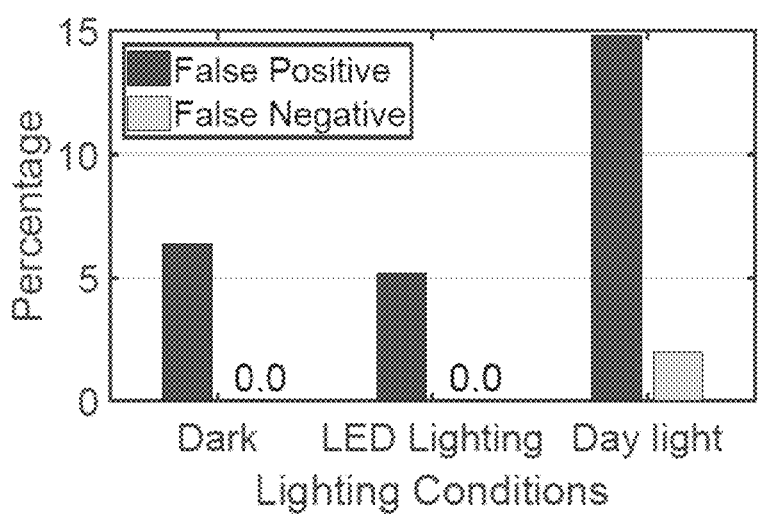
FIG. 13 illustrates the percentage of authentication trials that were able to pass the threshold in first step of our authentication phase.

FIG. 13 illustrates the percentage of authentication trials that were able to pass the threshold in first step of our authentication phase i.e. the temporal correlation between the passcode used on the screen and the passcode recovered from the recorded video. As shown, only 6.4%, 5.2% and 14.8% of the replay videos are accepted as genuine in this stage. We chose a threshold of 0.6, 0.6 and 0.5 for the dark, LED lighting and daylight conditions. Out of the false positives from the temporal correlation stage, 100% of the video attacks are detected in the dark and LED lighting conditions. In daylight condition, we achieve an EER of 2% only. This confirms that using a random light passcode for each use of our system helps detect replay video attacks easily. Since the software architecture performs much better in detecting the video replay attack compared to 2D photo attack, an attacker will be more likely use a photo to spoof the system. Hence, for the rest of the evaluation metrics, we only evaluated our system with human and 2D photo attack.

Figure 14A:
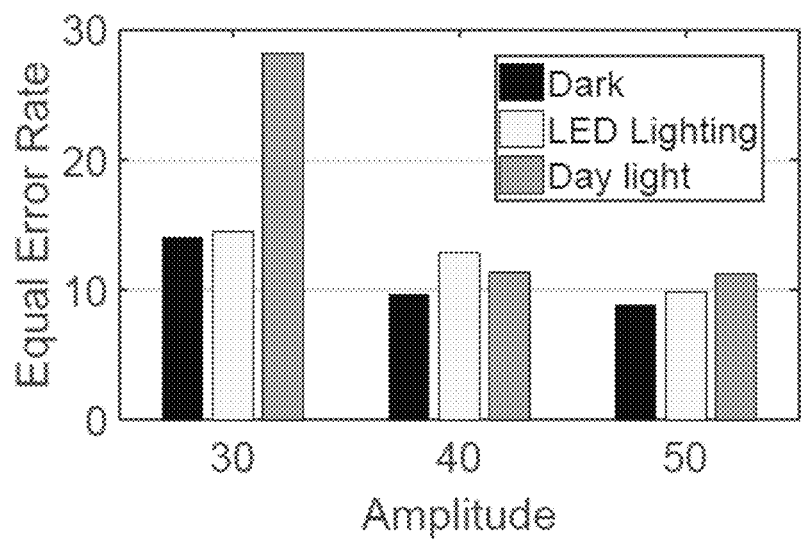
FIG. 14(a) illustrates the performance of the system against human attack in the different lighting conditions.
Figure 14B:
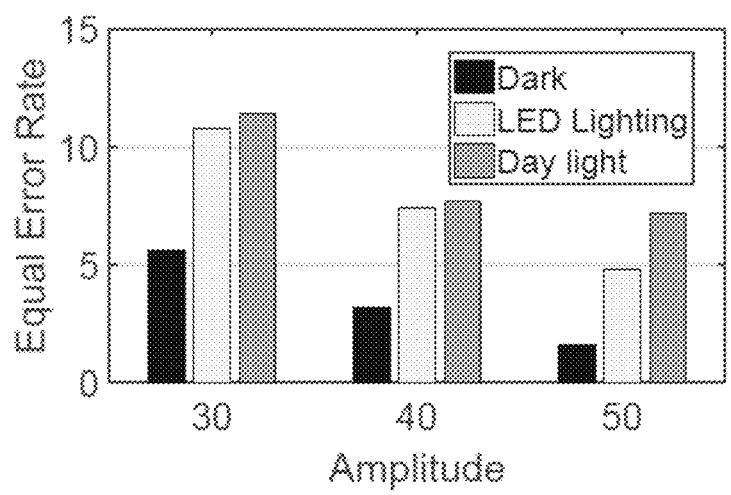
FIG. 14(b) illustrates performance against photo attack with varying amplitude for the passcode.

Here we determine the effect of changing the amplitude of the light passcode on the authentication performance and detecting photo attack. For this purpose, we conducted 25 authentication trials for each user with randomly selected passcodes of amplitudes 30, 40 and 50 and duration of 5 s. FIG. 14(a) illustrates the performance of the system against human attack in the different lighting conditions. FIG. 14(b) illustrates performance against photo attack with varying amplitude for the passcode. The system achieves an EER of 8.8% when the amplitude is 50 in dark room setting. The effect of the signal amplitude on the performance is related to the ambient lighting conditions. The system performs well in all lighting conditions when the amplitude is high because the signal reflected from the face is stronger. The EER becomes higher when the passcode has a weak amplitude compared to the strong ambient lighting. Similar observations are made for the photo attack using light passcodes of different amplitudes. FIG. 14(b) illustrates the performance against the photo attack.

Figure 15A:
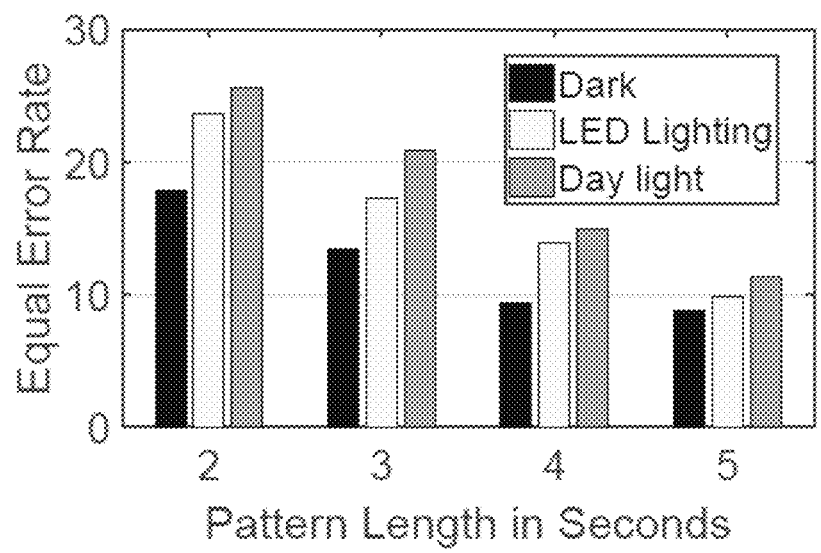
FIG. 15(a) illustrates the EER for human attack with different passcode duration under different lighting conditions.
Figure 15B:
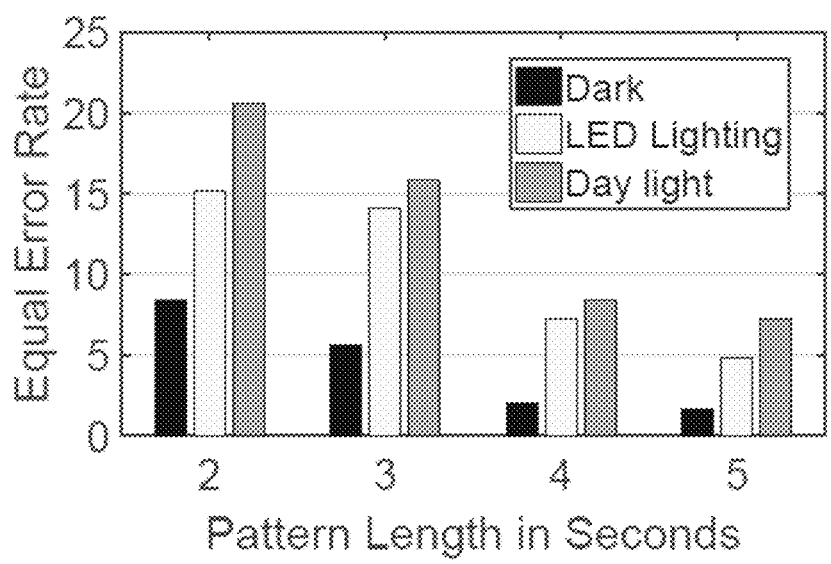
FIG. 15(b) shows the performance with varying passcode signal duration.

We then tested the performance using passcodes of time durations 1 to 5 s. FIG. 15(a) illustrates the EER for human attack with different passcode duration under different lighting conditions. We observe that a passcode of duration less than 3 s is not long enough to recover the stereo images correctly. FIG. 15(b) illustrates the performance with varying passcode signal duration. With a signal duration of 4 s, our system can achieve an ERR of 9% against human attack and a precision and recall value of 98% against photo attacks.

We also determine the effect of the passcode duration on the processing time in the authentication phase. FIG. 16 illustrates the processing time for the various components of our system with changing passcode duration. The duration of the passcode only effects the time taken to determine the least squared solution for recovering the four stereo images as that depends on the number of frames in the recorded video. The computation time for the other components of the system stays consistent across different passcode duration.

Next, we want to determine how the system performance change if we used a background image for the light pattern instead of the grey background. For this purpose, we selected a total of 5 background images (shown in FIG. 17(a)-17(e)). FIG. 17(f) illustrates an example of what the passcode frames look like with an image background across time. We performed experiments with 3 users where each user performed 5 registration and 50 authentication trials in the LED lighting condition using the 5 background images. Our system achieves an EER of 10% against human attack. This shows promise that the authentication process can be made more user friendly by using images of user's choice for the passcode pattern.

The software architecture provides a promising solid idea for secure face authentication without extra hardware. The system depends on light direction from the screen, so it is sensitive to hand or head motion. This could be addressed in the future by utilizing the landmark detection to track the movement of the face. Currently, our system performs well with a light passcode of duration 3-4 s. This duration might be considered long by some users for unlocking their smartphones. However, the authentication process can still be used for other applications like mobile payments. We also plan to investigate in future if the signal duration can be made shorter. The software architecture now requires a light amplitude of 50 to achieve a good accuracy. This light signal amplitude is visible to the user. It will be more usable to use an invisible signal. This requires investigating other camera features to recognize the small light changes.

The software architecture is a 3D authentication system which uses only a single smartphone camera without any extra hardware. Such software architecture uses the smartphone screen to illuminate the human face from various directions via a random light passcode. A video of the users' face is recorded to capture the reflections of the light signals from the face which is used to construct the depth maps of the face. The 3D facial features inherent in the depth maps are then used to detect if the authentication subject is the genuine user. On top of authenticating different human users, the software architecture can detect 2D photo and video replay attacks. The software architecture achieved a mean EER of 9.9%, 4.5% and 0.66% against human, photo and video attacks, respectively.

Example 2

One example of the present application relates to a non-transitory computer-readable medium encoded with a computer-readable program which, when executed by a processor, will cause a computer to execute a method of authenticating a 3-D object with a 2-D camera, the method including building a pre-determined database. The method additionally includes registering the 3-D object to a storage unit of a device comprising the 2-D camera, thereby creating a registered 3-D model of the 3-D object. Additionally, the method includes authenticating a test 3-D object by comparing the test 3-D object to the registered 3-D model.

In one or more embodiments, the building the pre-determined database includes using at least one of a set of frequencies or a set of phase offsets to create a plurality of selected patterns. Additionally, the building the pre-determined database includes creating a plurality of passcodes, wherein each passcode of the plurality of passcodes comprises at least three selected patterns. Moreover, the building the pre-determined database includes calculating an average of the at least three selected patterns, thereby generating a numerical value associated with the each passcode. Further, the building the pre-determined database includes selecting a subset of passcodes of the plurality of passcodes.

In one or more embodiments, the using the at least one of the set of frequencies of the set of phase offsets to create the plurality of selected patterns includes each pattern of the plurality of selected patterns that includes a cosine function of at least one of a chosen frequency, or a chosen phase offset.

In one or more embodiments, the selecting the subset of passcodes of the plurality of passcodes includes defining a similarity score between every pair of passcodes of the plurality of passcodes. The selecting the subset of passcodes of the plurality of passcodes further includes selecting the subset of passcodes, wherein the subset of passcodes comprises multitude of passcodes of the plurality of passcodes, wherein each pair of passcodes of the multitude of passcodes comprises a select similarity score, wherein the select similarity score is below a user-defined threshold value.

In one or more embodiments, the selecting the subset of passcodes includes selecting the subset of passcodes using a maximum independent set.

In one or more embodiments, the defining the similarity score between the every pair of passcodes of the plurality of passcodes includes calculating a correlation between the numerical value associated with each passcode of the each pair of passcodes.

In one or more embodiments, the registering the 3-D object to the storage unit of the device comprising the 2-D camera, thereby creating the registered 3-D model of the 3-D object includes reconstructing a computer generated 3-D model of the 3-D object, wherein the reconstructing includes choosing, randomly, a passcode from the pre-determined database, wherein the passcode comprises a plurality of selected patterns. Moreover, the reconstructing includes encoding the passcode to a random image, thereby generating an encoded sequence of images, wherein the encoded sequence of images includes k images. Further, the reconstructing includes combining a sequence of the random image with the encoded sequence of images, thereby creating a second sequence of images, wherein the sequence of the random image includes m number of random images. Next, the reconstructing includes displaying the second sequence of images on a screen of the device at a frame rate u, wherein u ranges from 0.01 Hz to 200 Hz. The reconstructing additionally includes recording a reflection of the second sequence of images from the 3-D object through the 2-D camera at a frame rate v, thereby creating a first recording, wherein v ranges from 0.01 Hz to 60000 Hz. The reconstructing further includes reconstructing from the first recording the computer generated 3-D model of the 3-D object. Furthermore, the reconstructing includes saving the computer generated 3-D model to the device.

In one or more embodiments, the encoding the passcode to the random image, thereby generating the encoded sequence of images includes dividing the random image by a first integer into a plurality of regions, wherein the first integer is a number of selected patterns in the passcode. Further, the encoding the passcode to the random image includes encode at least one selected pattern of the plurality of patterns into a region of the plurality of regions, wherein each region of the plurality of regions is encoded with a single different selected pattern of the plurality of patterns.

In one or more embodiments, the reconstructing from the first recording the computer generated 3-D model of the 3-D object includes recovering a plurality of stereo images from the first recording. Additionally, the reconstructing from the first recording the computer generated 3-D model of the 3-D object includes using the plurality of stereo images to reconstruct the computer generated 3-D model by a photometric stereo algorithm. In some embodiments, each stereo image of the plurality of stereo images includes a reflection of the 3-D object under an exposure of a single region from the plurality of regions in the random image, wherein only the single region is illuminated.

In some embodiments, the recovering the plurality of stereo images from the first recording includes solving a first equation, wherein the first equation includes A−B=WX, for X, wherein A includes a matrix representing a plurality of light intensity values received on each pixel in last $k*(v/u)$ frames of the first recording, wherein each row of the matrix includes the plurality of light intensity values of a single different frame from the last $k*(v/u)$ frames of the first recording, wherein B includes a first matrix, wherein the first matrix represents a second plurality of light intensity values, wherein the second plurality of light intensity values includes $k*(v/u)$ repetitions of an average light intensity value received on each pixel in first $m*(v/u)$ frames of the first recording, wherein W includes a second matrix of the plurality of selected patterns, wherein each column of the second matrix includes a single different selected pattern of the plurality of selected patterns, thereby generating a third matrix, wherein the third matrix includes X, wherein each row of the third matrix is a single different stereo image of the plurality of stereo images.

In some embodiments, the recovering the plurality of stereo images from the first recording includes solving a first equation, wherein the first equation includes A−B=f(WX), for X, wherein A includes a matrix representing a plurality of light intensity values received on each pixel in last $k*(v/u)$ frames of the first recording, wherein each row of the matrix includes the plurality of light intensity values of a single different frame from the last $k*(v/u)$ frames of the first recording, wherein B includes a first matrix, wherein the first matrix represents a second plurality of light intensity values, wherein the second plurality of light intensity values includes $k*(v/u)$ repetitions of an average light intensity value received on each pixel in first $m*(v/u)$ frames of the first recording, wherein f is a function of a camera response, wherein W includes a second matrix of the plurality of selected patterns, wherein each column of the second matrix includes a single different selected pattern of the plurality of selected patterns, thereby generating a third matrix, wherein the third matrix includes X, wherein each row of the third matrix is a single different stereo image of the plurality of stereo images, wherein the camera response includes a camera response curve.

In one or more embodiments, the authenticating the test 3-D object by comparing the test 3-D object to the registered 3-D model includes choosing, randomly, a passcode from the pre-determined database, wherein the passcode includes a plurality of selected patterns. The authenticating the test 3-D object further includes encoding the passcode to a random image, thereby generating an encoded sequence of images, wherein the encoded sequence of images includes k images. Furthermore, the authenticating the test 3-D object includes combining a sequence of the random image with the encoded sequence of images, thereby creating a second sequence of images, wherein the sequence of the random image includes m number of random images. Moreover, the authenticating the test 3-D object includes displaying the second sequence of images on a screen of the device. Next, the authenticating the test 3-D object includes recording a reflection of the second sequence of images from the test 3-D object through the 2-D camera, thereby creating a first recording. Additionally, the authenticating the test 3-D object includes comparing correlation between C and D, wherein C is a numerical value associated with the passcode, and D is an average of a plurality of light intensity values of each pixel of last k frames of the first recording, thereby obtaining a correlation value. The authenticating the test 3-D object further includes performing an authentication decision of the test 3-D object based on the correlation value.

In one or more embodiments, the performing the authentication decision based on the correlation value includes rejecting an authentication of the test 3-D object, wherein the correlation value is smaller than a user-defined threshold. Next, the performing the authenticating decision based on the correlation value includes reconstructing from the first recording a computer generated 3-D model of the test 3-D object. Furthermore, the performing the authenticating decision based on the correlation value includes comparing the computer generated 3-D model of the device to registered 3-D model.

In one or more embodiments, the comparing the computer generated 3-D model of the device to registered 3-D model includes aligning the computer generated 3-D model with the registered 3-D model, thereby producing an aligned model. Next, the comparing the computer generated 3-D model of the device to registered 3-D model includes computing a similarity score between the aligned model and the registered 3-D model. Additionally, the comparing the computer generated 3-D model of the device to registered 3-D model includes performing an authentication decision based on the similarity score. In at least one embodiment, the aligning the computer generated 3-D model with the registered 3-D model includes using an iterative closest point (ICP) algorithm.

In one or more embodiments, the authenticating the test 3-D object by comparing the test 3-D object to the registered 3-D model includes choosing, randomly, a passcode from the pre-determined database, wherein the passcode includes a plurality of selected patterns. Next, the authenticating the test 3-D object by comparing the test 3-D object to the registered 3-D model includes encoding the passcode to a random image, thereby generating an encoded sequence of images, wherein the encoded sequence of images includes k images. Additionally, the authenticating the test 3-D object by comparing the test 3-D object to the registered 3-D model includes combining a sequence of the random image with the encoded sequence of images, thereby creating a second sequence of images, wherein the sequence of the random image includes m number of random images. Moreover, the authenticating the test 3-D object by comparing the test 3-D object to the registered 3-D model includes displaying the second sequence of images on a screen of the device. Further, the authenticating the test 3-D object by comparing the test 3-D object to the registered 3-D model includes recording a reflection of the second sequence of images from the test 3-D object through the 2-D camera, thereby creating a first recording. The authenticating the test 3-D object by comparing the test 3-D object to the registered 3-D model further includes reconstructing from the first recording a computer generated 3-D model of the test 3-D object. The authenticating the test 3-D object by comparing the test 3-D object to the registered 3-D model additionally includes comparing the computer generated 3-D model of the device to registered 3-D model.

In one or more embodiments, the reconstructing from the first recording a computer generated 3-D model of the test 3-D object includes recovering a plurality of stereo images from the first recording. Additionally, the reconstructing from the first recording a computer generated 3-D model of the test 3-D object includes using the plurality of stereo images to reconstruct the computer generated 3-D model by a photometric stereo algorithm.

In some embodiments, the recovering the plurality of stereo images from the first recording includes solving a first equation, wherein the first equation comprises A−B=WX, for X, wherein A includes a matrix representing a plurality of light intensity values received on each pixel in last k*(v/u) frames of the first recording, wherein each row of the matrix comprises the plurality of light intensity values of a single different frame from the last k*(v/u) frames of the first recording, wherein B includes a first matrix, wherein the first matrix represents a second plurality of light intensity values, wherein the second plurality of light intensity values includes k*(v/u) repetitions of an average light intensity value received on each pixel in first m*(v/u) frames of the first recording, wherein W includes a second matrix of the plurality of selected patterns, wherein each column of the second matrix includes a single different selected pattern of the plurality of selected patterns, thereby generating a third matrix, wherein the third matrix includes X, wherein each row of the third matrix is a single different stereo image of the plurality of stereo images.

In some embodiments, the recovering the plurality of stereo images from the first recording includes solving a first equation, wherein the first equation comprises A−B=f(WX), for X, wherein A includes a matrix representing a plurality of light intensity values received on each pixel in last k*(v/u) frames of the first recording, wherein each row of the matrix includes the plurality of light intensity values of a single different frame from the last k*(v/u) frames of the first recording, wherein B includes a first matrix, wherein the first matrix represents a second plurality of light intensity values, wherein the second plurality of light intensity values includes k*(v/u) repetitions of an average light intensity value received on each pixel in first m*(v/u) frames of the first recording, wherein f is a function of a camera response, wherein W includes a second matrix of the plurality of selected patterns, wherein each column of the second matrix includes a single different selected pattern of the plurality of selected patterns, thereby generating a third matrix, wherein the third matrix includes X, wherein each row of the third matrix is a single different stereo image of the plurality of stereo images, wherein the camera response includes a camera response curve.

In one or more embodiments, the reconstructing from the first recording a computer generated 3-D model of the test 3-D object includes recovering a plurality of stereo images from the first recording. Additionally, the reconstructing from the first recording a computer generated 3-D model of the test 3-D object includes using the plurality of stereo images to reconstruct the computer generated 3-D model by a photometric stereo algorithm.

In some embodiments, the recovering the plurality of stereo images from the first recording includes solving a first equation, wherein the first equation comprises A−B=WX, for X, wherein A includes a matrix representing a plurality of light intensity values received on each pixel in last k*(v/u) frames of the first recording, wherein each row of the matrix includes the plurality of light intensity values of a single different frame from the last k*(v/u) frames of the first recording, wherein B includes a first matrix, wherein the first matrix represents a second plurality of light intensity values, wherein the second plurality of light intensity values includes k*(v/u) repetitions of an average light intensity value received on each pixel in first m*(v/u) frames of the first recording, wherein W includes a second matrix of the plurality of selected patterns, wherein each column of the second matrix includes a single different selected pattern of the plurality of selected patterns, thereby generating a third matrix, wherein the third matrix includes X, wherein each row of the third matrix is a single different stereo image of the plurality of stereo images.

In some embodiments, the recovering the plurality of stereo images from the first recording includes solving a first equation, wherein the first equation includes A−B=f(WX), for X, wherein A includes a matrix representing a plurality of light intensity values received on each pixel in last k*(v/u) frames of the first recording, wherein each row of the matrix includes the plurality of light intensity values of a single different frame from the last k*(v/u) frames of the first recording, wherein B includes a first matrix, wherein the first matrix represents a second plurality of light intensity values, wherein the second plurality of light intensity values includes k*(v/u) repetitions of an average light intensity value received on each pixel in first m*(v/u) frames of the first recording, wherein f is a function of a camera response, wherein W includes a second matrix of the plurality of selected patterns, wherein each column of the second matrix includes a single different selected pattern of the plurality of selected patterns, thereby generating a third matrix, wherein the third matrix comprises X, wherein each row of the third matrix is a single different stereo image of the plurality of stereo images, wherein the camera response includes a camera response curve.

One of ordinary skilled in the art would recognize that the methodology described in the above example is programmed into a software architecture which is differentiated by various protocols, wherein each discretized protocol is configured to execute a different method.

Figure 18:
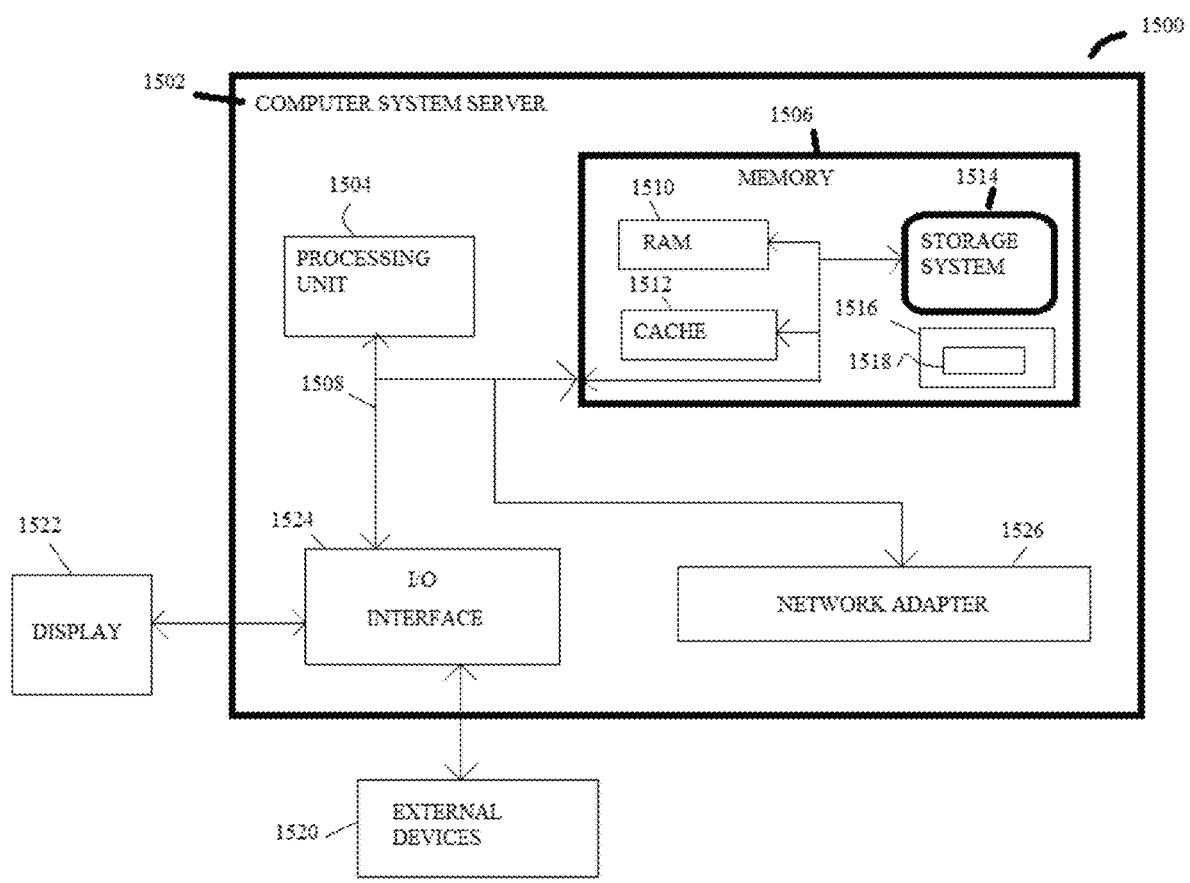
FIG. 18 illustrates one example of a computing or processing node 1200 for operating a method or a software architecture in accordance with the present application.

FIG. 18 illustrates one example of a computing or processing node 1500 for operating the methods and the software architecture of the present application. This is not intended to suggest any limitation as to the scope of use or functionality of embodiments of the invention described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the methods and the software architectures of the present application. The system memory 506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A non-transitory computer-readable medium encoded with a computer-readable program which, when executed by a processor, will cause a computer to execute a method of authenticating a 3-D object with a 2-D camera, the method comprising:
building a pre-determined database;
registering the 3-D object to a storage unit of a device comprising the 2-D camera, thereby creating a registered 3-D model of the 3-D object; and
authenticating a test 3-D object by comparing the test 3-D object to the registered 3-D model, wherein the authenticating the test 3-D object by comparing the test 3-D object to the registered 3-D model comprises:
choosing, randomly, a passcode from the pre-determined database, wherein the passcode comprises a plurality of selected patterns;
encoding the passcode to a random image, thereby generating an encoded sequence of images, wherein the encoded sequence of images comprises k images;
combining a sequence of the random image with the encoded sequence of images, thereby creating a second sequence of images, wherein the sequence of the random image comprises m number of random images;
displaying the second sequence of images on a screen of the device;
recording a reflection of the second sequence of images from the test 3-D object through the 2-D camera, thereby creating a first recording;
reconstructing from the first recording a computer generated 3-D model of the test 3-D object and
comparing the computer generated 3-D model of the device to registered 3-D model.

2. The method of claim 1, wherein the building the pre-determined database comprises:
using at least one of a set of frequencies or a set of phase offsets to create a plurality of selected patterns;
creating a plurality of passcodes, wherein each passcode of the plurality of passcodes comprises at least three selected patterns;
calculating an average of the at least three selected patterns, thereby generating a numerical value associated with the each passcode; and
selecting a subset of passcodes of the plurality of passcodes.

3. The method of claim 2, wherein the using the at least one of the set of frequencies or the set of phase offsets to create the plurality of selected patterns comprises:
each pattern of the plurality of selected patterns that comprises a cosine function of at least one of a chosen frequency, or a chosen phase offset.

4. The method of claim 2, wherein the selecting the subset of passcodes of the plurality of passcodes comprises:
defining a similarity score between every pair of passcodes of the plurality of passcodes; and
selecting the subset of passcodes, wherein the subset of passcodes comprises multitude of passcodes of the plurality of passcodes, wherein each pair of passcodes of the multitude of passcodes comprises a select similarity score, wherein the select similarity score is below a user-defined threshold value.

5. The method of claim 4, wherein the selecting the subset of passcodes comprises:
selecting the subset of passcodes using a maximum independent set.

6. The method of claim 4, wherein the defining the similarity score between the every pair of passcodes of the plurality of passcodes comprises:
calculating a correlation between the numerical value associated with each passcode of the each pair of passcodes.

7. The method of claim 1, wherein the registering the 3-D object to the storage unit of the device comprising the 2-D camera, thereby creating the registered 3-D model of the 3-D object comprises:
reconstructing a computer generated 3-D model of the 3-D object, wherein the reconstructing comprises:
choosing, randomly, a passcode from the pre-determined database, wherein the passcode comprises a plurality of selected patterns;
encoding the passcode to a random image, thereby generating an encoded sequence of images, wherein the encoded sequence of images comprises k images;
combining a sequence of the random image with the encoded sequence of images, thereby creating a second sequence of images, wherein the sequence of the random image comprises m number of random images;
displaying the second sequence of images on a screen of the device at a frame rate u, wherein u ranges from 0.01 Hz to 200 Hz;
recording a reflection of the second sequence of images from the 3-D object through the 2-D camera at a frame rate v, thereby creating a first recording, wherein v ranges from 0.01 Hz to 60000 Hz;
reconstructing from the first recording the computer generated 3-D model of the 3-D object; and
saving the computer generated 3-D model to the device.

8. The method of claim 7, wherein the encoding the passcode to the random image, thereby generating the encoded sequence of images comprises:
dividing the random image by a first integer into a plurality of regions, wherein the first integer is a number of selected patterns in the passcode; and
encoding at least one selected pattern of the plurality of patterns into a region of the plurality of regions, wherein each region of the plurality of regions is encoded with a single different selected pattern of the plurality of patterns.

9. The method of claim 7, wherein the reconstructing from the first recording the computer generated 3-D model of the 3-D object comprises:
recovering a plurality of stereo images from the first recording; and
using the plurality of stereo images to reconstruct the computer generated 3-D model by a photometric stereo algorithm.

10. The method of claim 9, wherein each stereo image of the plurality of stereo images comprises a reflection of the 3-D object under an exposure of a single region from a plurality of regions in the random image, wherein only the single region is illuminated.

11. The method of claim 9, wherein the recovering the plurality of stereo images from the first recording comprises:

solving a first equation, wherein the first equation comprises A−B=WX, for X, wherein A comprises a matrix representing a plurality of light intensity values received on each pixel in last k*(v/u) frames of the first recording, wherein each row of the matrix comprises the plurality of light intensity values of a single different frame from the last k*(v/u) frames of the first recording, wherein B comprises a first matrix, wherein the first matrix represents a second plurality of light intensity values, wherein the second plurality of light intensity values comprises k*(v/u) repetitions of an average light intensity value received on each pixel in first m*(v/u) frames of the first recording, wherein W comprises a second matrix of the plurality of selected patterns, wherein each column of the second matrix comprises a single different selected pattern of the plurality of selected patterns, thereby generating a third matrix, wherein the third matrix comprises X, wherein each row of the third matrix is a single different stereo image of the plurality of stereo images.

12. The method of claim 9, wherein the recovering the plurality of stereo images from the first recording comprises:
solving a first equation, wherein the first equation comprises A−B=f(WX), for X, wherein A comprises a matrix representing a plurality of light intensity values received on each pixel in last k*(v/u) frames of the first recording, wherein each row of the matrix comprises the plurality of light intensity values of a single different frame from the last k*(v/u) frames of the first recording, wherein B comprises a first matrix, wherein the first matrix represents a second plurality of light intensity values, wherein the second plurality of light intensity values comprises k*(v/u) repetitions of an average light intensity value received on each pixel in first m*(v/u) frames of the first recording, wherein f is a function of a camera response, wherein W comprises a second matrix of the plurality of selected patterns, wherein each column of the second matrix comprises a single different selected pattern of the plurality of selected patterns, thereby generating a third matrix, wherein the third matrix comprises X, wherein each row of the third matrix is a single different stereo image of the plurality of stereo images, wherein the camera response comprises a camera response curve.

13. The method of claim 1, wherein the authenticating the test 3-D object by comparing the test 3-D object to the registered 3-D model comprises:
choosing, randomly, a passcode from the pre-determined database, wherein the passcode comprises a plurality of selected patterns;
encoding the passcode to a random image, thereby generating an encoded sequence of images, wherein the encoded sequence of images comprises k images;
combining a sequence of the random image with the encoded sequence of images, thereby creating a second sequence of images, wherein the sequence of the random image comprises m number of random images;
displaying the second sequence of images on a screen of the device;
recording a reflection of the second sequence of images from the test 3-D object through the 2-D camera, thereby creating a first recording;
comparing correlation between C and D, wherein C is a numerical value associated with the passcode, and D is an average of a plurality of light intensity values of each pixel of last k frames of the first recording, thereby obtaining a correlation value; and
performing an authentication decision of the test 3-D object based on the correlation value.

14. The method of claim 13, wherein the performing the authentication decision based on the correlation value comprises:
rejecting an authentication of the test 3-D object, wherein the correlation value is smaller than a user-defined threshold;
reconstructing from the first recording a computer generated 3-D model of the test 3-D object; and
comparing the computer generated 3-D model of the device to registered 3-D model.

15. The method of claim 14, wherein the comparing the computer generated 3-D model of the device to registered 3-D model comprises:
aligning the computer generated 3-D model with the registered 3-D model, thereby producing an aligned model;
computing a similarity score between the aligned model and the registered 3-D model; and
performing an authentication decision based on the similarity score.

16. The method of claim 15, wherein the aligning the computer generated 3-D model with the registered 3-D model comprises:
using an iterative closest point (ICP) algorithm.

17. The method of claim 1, wherein the reconstructing from the first recording a computer generated 3-D model of the test 3-D object comprises: recovering a plurality of stereo images from the first recording; and using the plurality of stereo images to reconstruct the computer generated 3-D model by a photometric stereo algorithm.

18. The method of claim 17, wherein the recovering the plurality of stereo images from the first recording comprises:
solving a first equation, wherein the first equation comprises A−B=WX, for X, wherein A comprises a matrix representing a plurality of light intensity values received on each pixel in last k*(v/u) frames of the first recording, wherein each row of the matrix comprises the plurality of light intensity values of a single different frame from the last k*(v/u) frames of the first recording, wherein B comprises a first matrix, wherein the first matrix represents a second plurality of light intensity values, wherein the second plurality of light intensity values comprises k*(v/u) repetitions of an average light intensity value received on each pixel in first m*(v/u) frames of the first recording, wherein W comprises a second matrix of the plurality of selected patterns, wherein each column of the second matrix comprises a single different selected pattern of the plurality of selected patterns, thereby generating a third matrix, wherein the third matrix comprises X, wherein each row of the third matrix is a single different stereo image of the plurality of stereo images.

19. The method of claim 17, wherein the recovering the plurality of stereo images from the first recording comprises:
solving a first equation, wherein the first equation comprises A−B=f(WX), for X, wherein A comprises a matrix representing a plurality of light intensity values received on each pixel in last k*(v/u) frames of the first recording, wherein each row of the matrix comprises the plurality of light intensity values of a single different frame from the last k*(v/u) frames of the first recording, wherein B comprises a first matrix, wherein the first matrix represents a second plurality of light intensity values, wherein the second plurality of light intensity values comprises k*(v/u) repetitions of an average light intensity value received on each pixel in first m*(v/u) frames of the first recording, wherein f is a function of a camera response, wherein W comprises a second matrix of the plurality of selected patterns, wherein each column of the second matrix comprises a single different selected pattern of the plurality of selected patterns, thereby generating a third matrix, wherein the third matrix comprises X, wherein each row of the third matrix is a single different stereo image of the plurality of stereo images, wherein the camera response comprises a camera response curve.

20. The method of claim 14, wherein the reconstructing from the first recording a computer generated 3-D model of the test 3-D object comprises:
recovering a plurality of stereo images from the first recording; and
using the plurality of stereo images to reconstruct the computer generated 3-D model by a photometric stereo algorithm.

21. The method of claim 20, wherein the recovering the plurality of stereo images from the first recording comprises:
solving a first equation, wherein the first equation comprises A−B=WX, for X, wherein A comprises a matrix representing a plurality of light intensity values received on each pixel in last k*(v/u) frames of the first recording, wherein each row of the matrix comprises the plurality of light intensity values of a single different frame from the last k*(v/u) frames of the first recording, wherein B comprises a first matrix, wherein the first matrix represents a second plurality of light intensity values, wherein the second plurality of light intensity values comprises k*(v/u) repetitions of an average light intensity value received on each pixel in first m*(v/u) frames of the first recording, wherein W comprises a second matrix of the plurality of selected patterns, wherein each column of the second matrix comprises a single different selected pattern of the plurality of selected patterns, thereby generating a third matrix, wherein the third matrix comprises X, wherein each row of the third matrix is a single different stereo image of the plurality of stereo images.

22. The method of claim 20, wherein the recovering the plurality of stereo images from the first recording comprises:
solving a first equation, wherein the first equation comprises A−B=f(WX), for X, wherein A comprises a matrix representing a plurality of light intensity values received on each pixel in last k*(v/u) frames of the first recording, wherein each row of the matrix comprises the plurality of light intensity values of a single different frame from the last k*(v/u) frames of the first recording, wherein B comprises a first matrix, wherein the first matrix represents a second plurality of light intensity values, wherein the second plurality of light intensity values comprises k*(v/u) repetitions of an average light intensity value received on each pixel in first m*(v/u) frames of the first recording, wherein f is a function of a camera response, wherein W comprises a second matrix of the plurality of selected patterns, wherein each column of the second matrix comprises a single different selected pattern of the plurality of selected patterns, thereby generating a third matrix, wherein the third matrix comprises X, wherein each row of the third matrix is a single different stereo image of the plurality of stereo images, wherein the camera response comprises a camera response curve.

23. A non-transitory computer-readable medium encoded with a computer-readable program which, when executed by a processor, will cause a computer to execute a method of authenticating a 3-D object with a 2-D camera, the method comprising:
building a pre-determined database, wherein building the pre-determined database comprises:
using at least one of a set of frequencies or a set of phase offsets to create a plurality of selected patterns;
creating a plurality of passcodes, wherein each passcode of the plurality of passcodes comprises at least three selected patterns;
calculating an average of the at least three selected patterns, thereby generating a numerical value associated with the each passcode; and
selecting a subset of passcodes of the plurality of passcodes;
registering the 3-D object to a storage unit of a device comprising the 2-D camera, thereby creating a registered 3-D model of the 3-D object; and
authenticating a test 3-D object by comparing the test 3-D object to the registered 3-D model.

24. A non-transitory computer-readable medium encoded with a computer-readable program which, when executed by a processor, will cause a computer to execute a method of authenticating a 3-D object with a 2-D camera, the method comprising:
building a pre-determined database;
registering the 3-D object to a storage unit of a device comprising the 2-D camera, thereby creating a registered 3-D model of the 3-D object, wherein the registering the 3-D object to the storage unit of the device comprising the 2-D camera, thereby creating the registered 3-D model of the 3-D object comprises:
reconstructing a computer generated 3-D model of the 3-D object, wherein the reconstructing comprises:
choosing, randomly, a passcode from the pre-determined database, wherein the passcode comprises a plurality of selected patterns;
encoding the passcode to a random image, thereby generating an encoded sequence of images, wherein the encoded sequence of images comprises k images;
combining a sequence of the random image with the encoded sequence of images, thereby creating a second sequence of images, wherein the sequence of the random image comprises m number of random images;
displaying the second sequence of images on a screen of the device at a frame rate u, wherein u ranges from 0.01 Hz to 200 Hz;
recording a reflection of the second sequence of images from the 3-D object through the 2-D camera at a frame rate v, thereby creating a first recording, wherein v ranges from 0.01 Hz to 60000 Hz;
reconstructing from the first recording the computer generated 3-D model of the 3-D object; and
saving the computer generated 3-D model to the device; and
authenticating a test 3-D object by comparing the test 3-D object to the registered 3-D model.

25. The method of claim 24, wherein the building the pre-determined database comprises:
using at least one of a set of frequencies or a set of phase offsets to create a plurality of selected patterns;
creating a plurality of passcodes, wherein each passcode of the plurality of passcodes comprises at least three selected patterns;

calculating an average of the at least three selected patterns, thereby generating a numerical value associated with the each passcode; and selecting a subset of passcodes of the plurality of passcodes.

\* \* \* \* \*